US012749838B2

(12) United States Patent
Gibbs et al.

(10) Patent No.: US 12,749,838 B2
(45) Date of Patent: Sep. 29, 2026

(54) PORT OCCUPANCY SENSING AT SHUTTERED PORTS

(71) Applicant: CommScope Technologies LLC, Hickory, NC (US)

(72) Inventors: Gary Federico Gibbs, Wylie, TX (US); Ryan Edward Enge, Carrollton, TX (US); Pedro Maldonado, Dallas, TX (US); Brian J. Fitzpatrick, McKinney, TX (US); Steven Walter Knoernschild, Allen, TX (US)

(73) Assignee: CommScope Technologies LLC, Hickory, NC (US)

( * ) Notice: Subject to any disclaimer, the term of this patent is extended or adjusted under 35 U.S.C. 154(b) by 398 days.

(21) Appl. No.: 18/464,028

(22) Filed: Sep. 8, 2023

(65) Prior Publication Data

US 2024/0072475 A1 Feb. 29, 2024

Related U.S. Application Data

(63) Continuation of application No. PCT/US2022/019922, filed on Mar. 11, 2022.

(60) Provisional application No. 63/282,048, filed on Nov. 22, 2021, provisional application No. 63/278,938, filed on Nov. 12, 2021, provisional application No. 63/159,827, filed on Mar. 11, 2021.

(51) Int. Cl.
*H01R 13/24* (2006.01)
*H01R 13/187* (2006.01)
*H01R 13/453* (2006.01)

(52) U.S. Cl.
CPC ....... *H01R 13/187* (2013.01); *H01R 13/2464* (2013.01); *H01R 13/453* (2013.01)

(58) Field of Classification Search
CPC . H01R 13/187; H01R 13/2464; H01R 13/453
See application file for complete search history.

(56) References Cited

U.S. PATENT DOCUMENTS

| | | | | |
|---|---|---|---|---|
| 5,363,460 A * | 11/1994 | Marazzi | G02B 6/3849 | 385/77 |
| 6,079,881 A * | 6/2000 | Roth | G02B 6/3869 | 385/139 |
| 6,081,647 A * | 6/2000 | Roth | G02B 6/3885 | 385/139 |
| 6,247,849 B1 * | 6/2001 | Liu | G02B 6/3849 | 385/94 |
| 6,685,362 B2 * | 2/2004 | Burkholder | G02B 6/3849 | 439/607.34 |
| 7,144,163 B2 * | 12/2006 | Tanaka | G02B 6/3897 | 385/55 |

(Continued)

FOREIGN PATENT DOCUMENTS

| | | |
|---|---|---|
| CN | 201877657 U | 6/2011 |
| WO | 2020/106711 A1 | 5/2020 |

OTHER PUBLICATIONS

International Search Report and Written Opinion for Application No. PCT/US2022/019922 mailed Jun. 27, 2022.

*Primary Examiner* — Renee S Luebke
(74) *Attorney, Agent, or Firm* — Merchant & Gould P.C.

(57) ABSTRACT

The presence of a plug connector with a port is detected through a detection circuit activated by a port shutter. Transitioning the port shutter between the closed (i.e., blocking the port) position and the open position actuates and deactuates the detection circuit.

20 Claims, 32 Drawing Sheets

(56) References Cited

U.S. PATENT DOCUMENTS

| | | | | |
|---|---|---|---|---|
| 7,867,017 | B1 | 1/2011 | Chen | |
| 8,491,198 | B2 * | 7/2013 | Lin | G02B 6/3825 385/75 |
| 8,596,882 | B2 | 12/2013 | Smrha et al. | |
| 8,992,260 | B2 | 3/2015 | Coffey et al. | |
| 9,054,440 | B2 | 6/2015 | Taylor et al. | |
| 9,453,963 | B2 * | 9/2016 | Sato | G02B 6/241 |
| 9,538,262 | B2 | 1/2017 | German et al. | |
| 10,852,486 | B2 * | 12/2020 | Hsu | G02B 6/3865 |
| 2006/0148279 | A1 | 7/2006 | German et al. | |
| 2010/0190366 | A1 | 7/2010 | Fitzpatrick | |
| 2013/0260603 | A1 | 10/2013 | Caveney et al. | |
| 2015/0241650 | A1 | 8/2015 | Travis | |
| 2016/0056598 | A1 | 2/2016 | Taylor et al. | |
| 2018/0102602 | A1 | 4/2018 | Chen | |
| 2020/0166713 | A1 | 5/2020 | Anderson et al. | |
| 2023/0124584 | A1 | 4/2023 | German et al. | |
| 2023/0328410 | A1 | 10/2023 | Rietveld | |

* cited by examiner

PORT OCCUPANCY SENSING AT SHUTTERED PORTS

CROSS-REFERENCE TO RELATED APPLICATIONS

This application is a Continuation of International Patent Application No. PCT/US2022/019922, filed on Mar. 11, 2022, which claims the benefit of U.S. Patent Application Ser. No. 63/159,827, filed on Mar. 11, 2021, and claims the benefit of U.S. Patent Application Ser. No. 63/278,938, filed on Nov. 12, 2021, and claims the benefit of U.S. Patent Application Ser. No. 63/282,048, filed on Nov. 22, 2021, the disclosures of which are incorporated herein by reference in their entireties. To the extent appropriate, a claim of priority is made to each of the above disclosed applications.

BACKGROUND

As computer equipment is, for example, added, moved or replaced in a data center, it often becomes necessary to make temporary and/or permanent changes to the interconnection scheme. Conventionally, the interconnections of the various equipment using cables were logged in a paper or a computer-based log. However, if a technician neglects to update the log each and every time a change is made, and/or makes errors in logging changes, then the paper or computer based logs will no longer be fully accurate. As a result, in some cases, each time a technician needs to change a patch cord, the technician would manually trace that patch cord between two connector points by locating one end of the patch cord and then manually following the patch cord until he/she finds the opposite end of that patch cord. However, in large scale data center operations the manual tracing of patch cords may be difficult or even impossible given the large number of connections, the cable routing mechanisms that are typically used to keep the cable portions of each patch cord out of the way and neatly routed and the spacing of the equipment. As such, systems for automatically detecting and logging patch cord connections have been proposed. Improvements are desired.

SUMMARY

Some aspects of the disclosure are directed a method for detecting a presence of a plug connector at a port. The method includes deflecting a port shutter from a closed position covering the port towards an open position by pushing the shutter with a plug connector; and electrically connecting a spring contact mounted to the shutter to a landing pad on the circuit board, thereby opening or closing a circuit that includes the landing pad.

In some implementations, the shutter is deflected until the spring contact engages the landing pad. In other implementations, the shutter is deflected until the spring contact engages a secondary spring contact mounted to the landing pad.

Other aspects of the disclosure are directed to a port arrangement configured to align a first optical fiber terminated by a plug connector with a second optical fiber. The port arrangement includes a circuit board including a landing pad; a body defining a port and a window through which the landing pad is accessible from an interior of the body; a shutter mounted to the body at the port; and a spring contact member coupled to the shutter. The In certain implementations, the shutter is movable between a closed position and an open position. The shutter blocks access to the port from an exterior of the body when disposed in the closed position. The shutter allows access to the port from the exterior of the body when disposed in the open position.

In certain implementations, the spring contact member defines a contact surface. The contact surface is movable from a non-engagement position to an engagement position. The contact surface is electrically connected to the landing pad when disposed in the engagement position and is not electrically connected to the landing pad when disposed in the non-engagement position.

In some implementations, the shutter is electrically connected to ground. In other implementations, the spring contact is configured to electrically bridge the landing pad to a second landing pad connected to ground.

In certain implementations, the spring contact defines a slit.

In certain implementations, multiple spring contacts are integrally formed.

In some implementations, the spring contacts include a contact surface that moves with the shutter. In other implementations, the shutter moves relative to the spring contact.

In some implementations, the spring contact biases the shutter to the closed position. In other implementations, the shutter is biased to the closed position by a separate spring contact.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
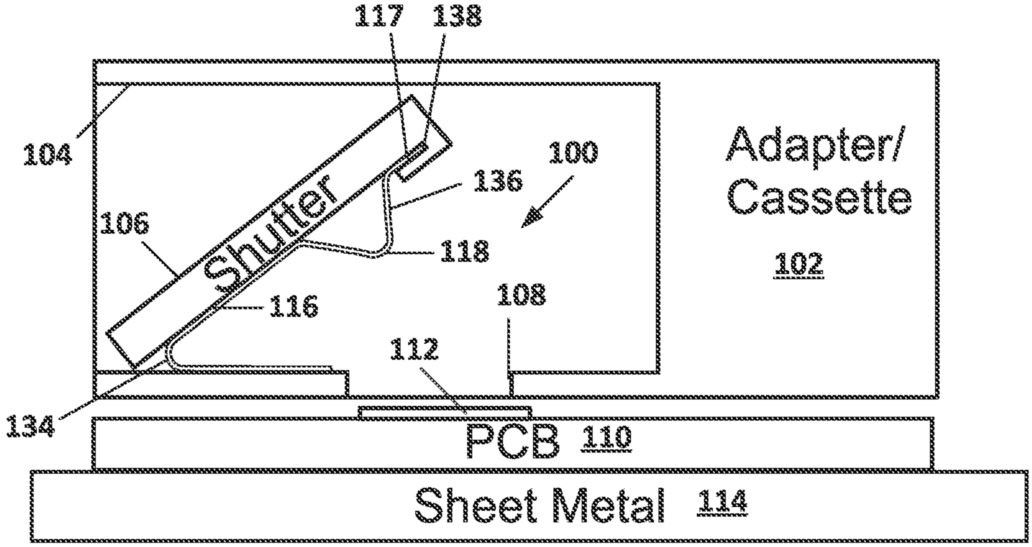
FIG. 1 is a schematic diagram showing an adapter having a shutter closing a port, the shutter carrying a first example type of contact of a presence detection circuit.
Figure 2:
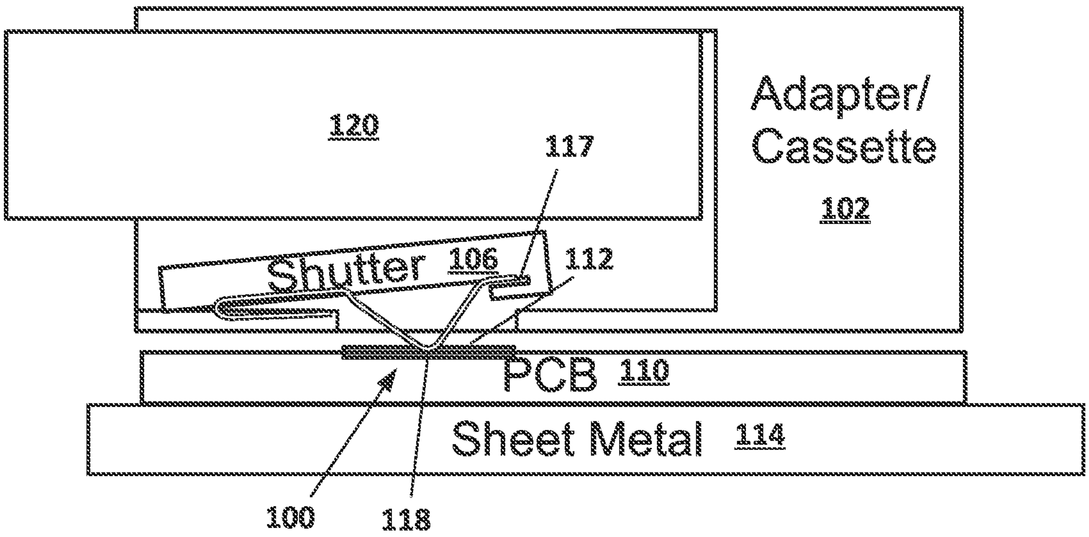
FIG. 2 shows a plug connector inserted in the port of FIG. 1, the plug connector opening the shutter and pressing the contact against a landing pad of a circuit board.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a systems and methods to detect port availability or occupancy. In particular, the present disclosure includes presence detectors that work with shutters mounted at the ports. The presence detector is configured in a first state when the shutter is disposed in a closed position covering the port. The presence detector is configured in a second state when the shutter is disposed in an open position. Inserting a plug connector into the port transitions the shutter from the closed position to the open position. In certain examples, removing the plug connector from the port transitions the shutter from the open position to the closed position.

Referring to FIGS. 1-5, a body 102 defines a port 104 at which a shutter 106 is disposed. The shutter 106 is movable (e.g., pivotal or deflectable) between a closed position (e.g., see FIG. 1) and an open position (e.g., see FIG. 2). When in the closed position, the shutter 106 extends across the port 104 and inhibits entrance into the port 104 for dust or other such debris. In certain implementations, the port 104 is a first port and the body 102 also defines a second port (e.g., see FIG. 13) aligned with the port 104. The shutter 106 may also block laser light emitted from one or more fibers received at the second port from exiting the port 104.

In some implementations, the body 102 includes an optical adapter configured to receive, mechanically align, and optically couple together at least one pair of plug connectors. In other implementations, the body 102 may include a female connector that terminates an optical cable at one end and defines the port 104 at the opposite end. In other implementations, the body 102 includes an electrical jack (e.g., an RJ-45 jack) and the port 104 is a socket of the electrical jack. In still other implementations, the body 102 may be configured to receive and retain a hybrid plug connector.

The body 102 defines a window 108 providing access between the interior and the exterior of the body 102. The body 102 is mounted in relation to a circuit board 110 so that a landing pad 112 carried by the circuit board 110 aligns with the window 108. In some implementations, the body 102 is mounted to the circuit board 110. In other implementations, the body 102 and the circuit board 110 are both mounted to a substrate (e.g., a tray, a panel, a cassette, etc.).

A presence detector 100 senses whether the port 104 is available or occupied. The presence detector 100 includes a spring contact member 116 mounted to the shutter 106. In certain examples, the spring contact member 116 is disposed at an interior surface of the shutter 106. The spring contact member 116 defines a contact surface 118. When the shutter 106 is disposed in the closed position, the contact surface 118 is electrically disconnected from the landing pad 112 (e.g., see FIG. 1). When the shutter 106 is disposed in the open position, the contact surface 118 is electrically connected to the landing pad 112 through the window 108 (e.g., see FIG. 2).

In certain implementations, the shutter 106 is moved from the closed position to the open position when a plug connector 120 is inserted into the port 104. In particular, a plug nose end of the plug connector 120 engages the shutter 106 and pushes the shutter 106 to the open position to enable the plug connector 120 to enter the port 104. At least a portion of the spring contact member 116 is pushed by the shutter 106 towards the window 108.

Figure 3:
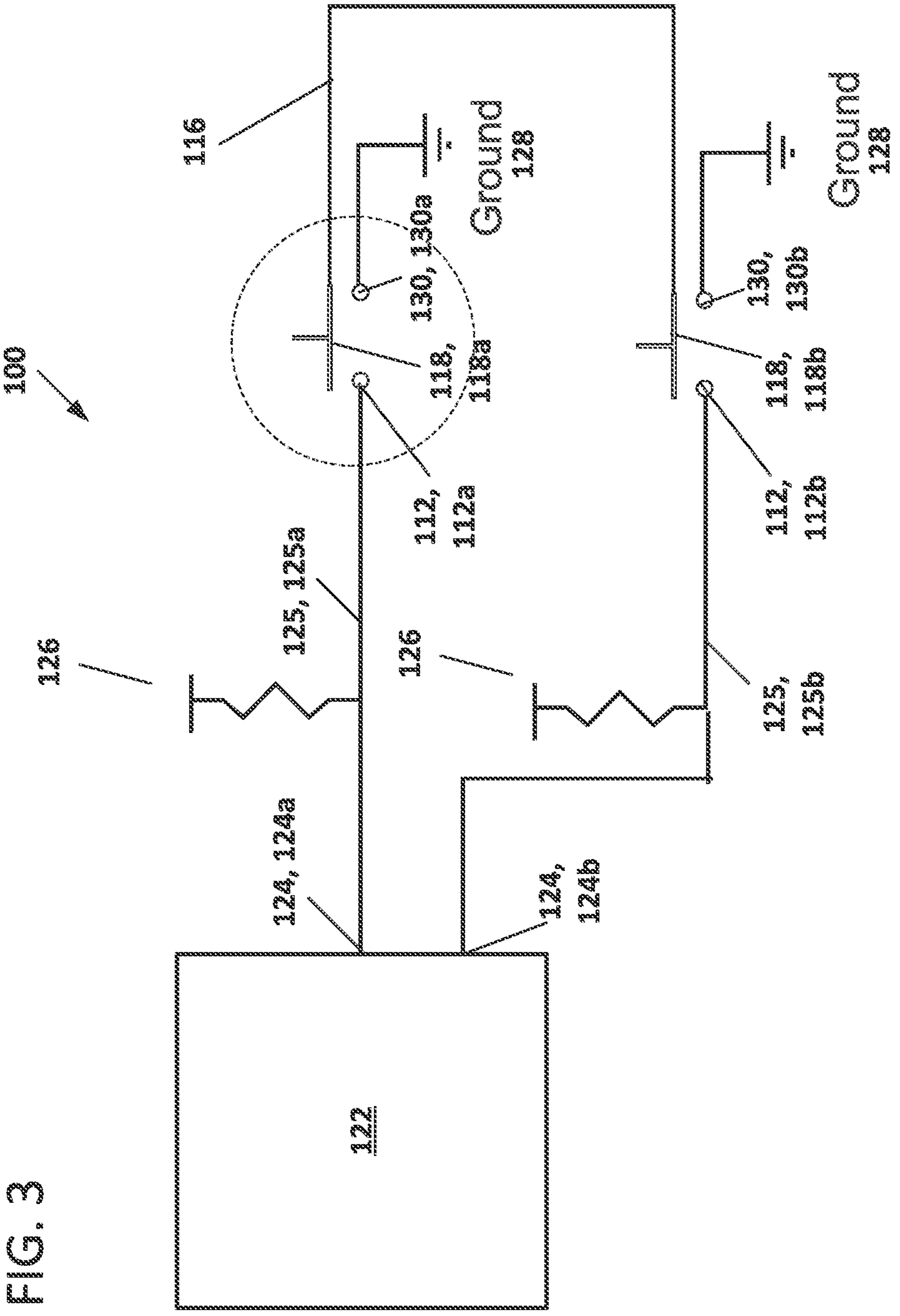
FIG. 3 is a circuit diagram of the circuit board and landing pad of FIG. 2.

FIG. 3 shows a circuit diagram for the presence detector 100. A voltage 126 is applied to the landing pad 112 via a first line 125. A processor (e.g., a microcontroller) 122 is electrically connected to the first line 125 at an input 124. In the example shown, the processor 122 determines the shutter 106 is closed when the input 124 receives the voltage 126 via the first line 125. The spring contact member 116 acts as a switch to connect the first line 125 to ground 128. In the example shown, a second landing pad 130 is connected to ground 128 and the contact surface 118 of the spring contact member 116 bridges the landing pads 112, 130 (e.g., see FIG. 4). In other examples, the spring contact member 116 itself can be connected to ground (e.g., see FIG. 5).

As shown in FIG. 3, the same spring contact member 116 may define multiple contact surfaces 118*a*, 118*b*. For example, the same spring contact member 116 may extend along multiple shutters 106 and multiple ports 104. In certain such examples, each contact surface 118*a*, 118*b* may be aligned with a respective one of the ports 104. In the example shown in FIG. 3, a first pair of landing pads 112*a*, 130*a* are associated with a first port 104 and a second pair of landing pads 112*b*, 130*b* are associated with a second port 104. The first landing pad 112*a*, 112*b* of each pair is connected to a voltage 126 via a respective electrical line 125*a*, 125*b*, which are received at respective inputs 124*a*, 124*b* of the processor 122. A first contact surface 118*a* bridges the first pair of landing pads 112*a*, 130*a*, thereby connecting the first line 125*a* to ground 128, when the spring contact member 116 is deflected at the first port 104. The processor 122 detects when the electrical signal received at the first input 124*a* is grounded. A contact surface 118*b* bridges the second pair of landing pads 112*b*, 130*b*, thereby connecting the second line 125*b* to ground 128, when the spring contact member 116 is deflected at the second port 104. The processor 122 detects when the electrical signal received at the second input 124*b* is grounded. Accordingly, the same spring contact member 116 can be utilized across multiple ports 104.

Figure 5:
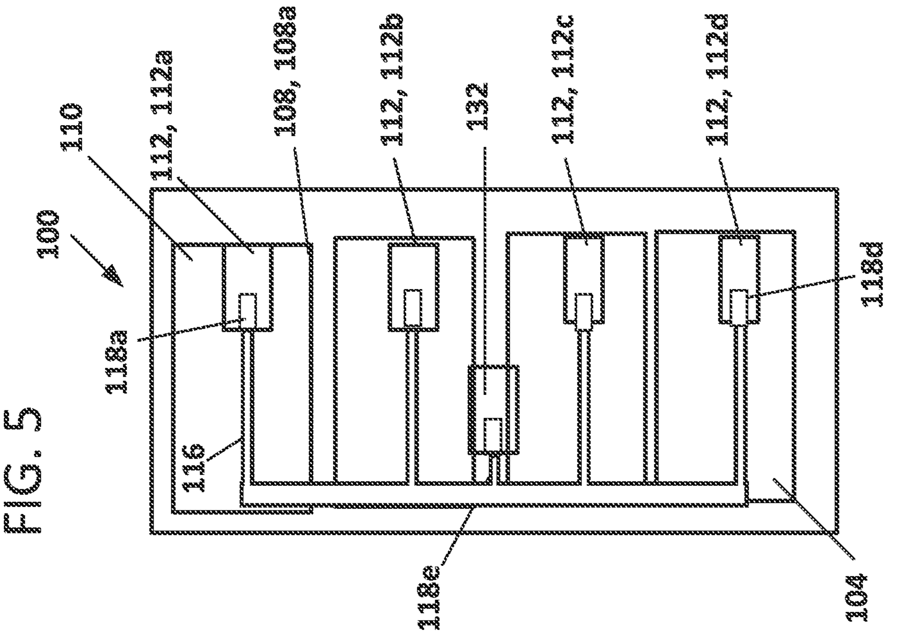
FIG. 5 is a top plan view of a second example implementation of the circuit board of FIG. 2.
Figure 4:
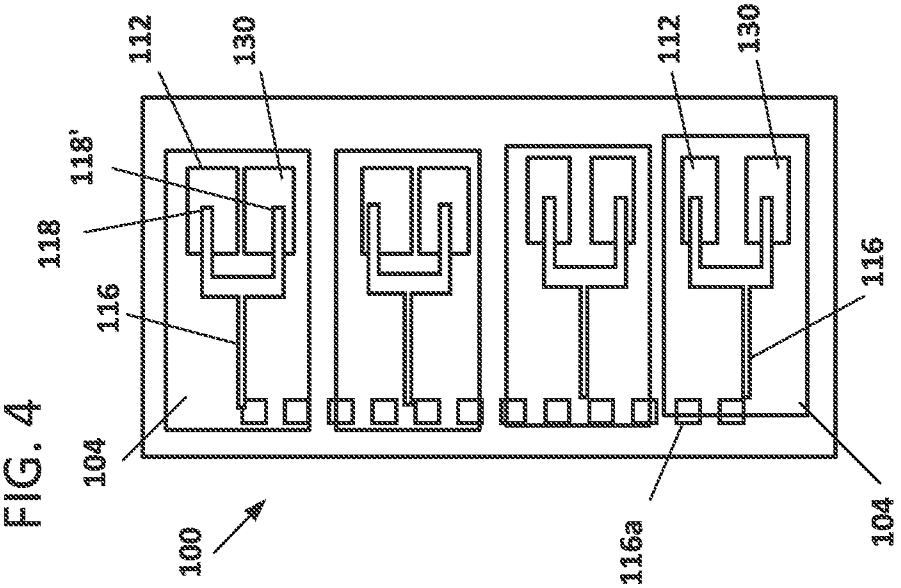
FIG. 4 is a top plan view of a first example implementation of the circuit board of FIG. 2.

FIGS. 4 and 5 illustrate different ways to connect the landing pad 112 to ground. In FIG. 4, each spring contact member 116 defines two contact surfaces 118, 118'. The first contact surface 118 aligns with the first landing pad 112 connected to a voltage 126 and the second contact surface 118' aligns with the second landing pad 130 connected to ground 128. Accordingly, deflecting the spring contact member 116 towards the landing pads 112, 130 will electrically bridge the two landing pads 112, 130. As shown in FIG. 3, the first landing pad 112 can be connected to a line 125 that is input into a processor 122.

In certain implementations, each pair of landing pads 112, 130 is associated with a separate port 104. In some examples, each pair of landing pads 112, 130 is selectively bridged by a separate spring contact member 116. In other examples, two or more of the spring contact members 116 are physically and/or electrically connected together (e.g., see dashed line 116*a*).

In FIG. 5, only one landing pad 112 is present at each port 104. The spring contact member 116 is always connected to ground 128 via a grounding pad 132. In certain implementations, the spring contact member 116 can define multiple contact surfaces (e.g., contact surfaces 118*a*, 118*d*) that each align with the landing pad 112 of one of the ports 104. Each of the contact surfaces 118*a*, 118*d* is connected to ground 128 via a grounding surface 118*e* of the spring contact member 116. The grounding surface 118*e* contacts the grounding pad 132. In other examples, the grounding surface 118*e* is otherwise connected to ground.

In accordance with some aspects of the disclosure, the spring contact member 116 includes a resilient section providing a biasing force. In some implementations, the resilient section biases the shutter 106 to the closed position. In other implementations, the resilient section biases the contact surface 118 against the respective landing pad 112, 130. In other implementations, the spring contact member 116 includes a first resilient section that biases the shutter 106 to the closed position and a second resilient section that biases the contact surface 118 against the respective landing pad 112, 130.

Referring back to FIG. 1, the spring contact member 116 include a first resilient portion 134 that biases the shutter 106 to the closed position. The spring contact member 116 also includes a second resilient portion 136 that biases the contact surface 118 against a respective landing pad 112. In the example shown, a free end 117 of the spring contact member 116 can slide along a pocket or groove 138 defined in the shutter 106. This sliding allows the second resilient portion 136 to flex (e.g., compare the free end 117 in FIG. 1 and FIG. 2).

Figure 6:
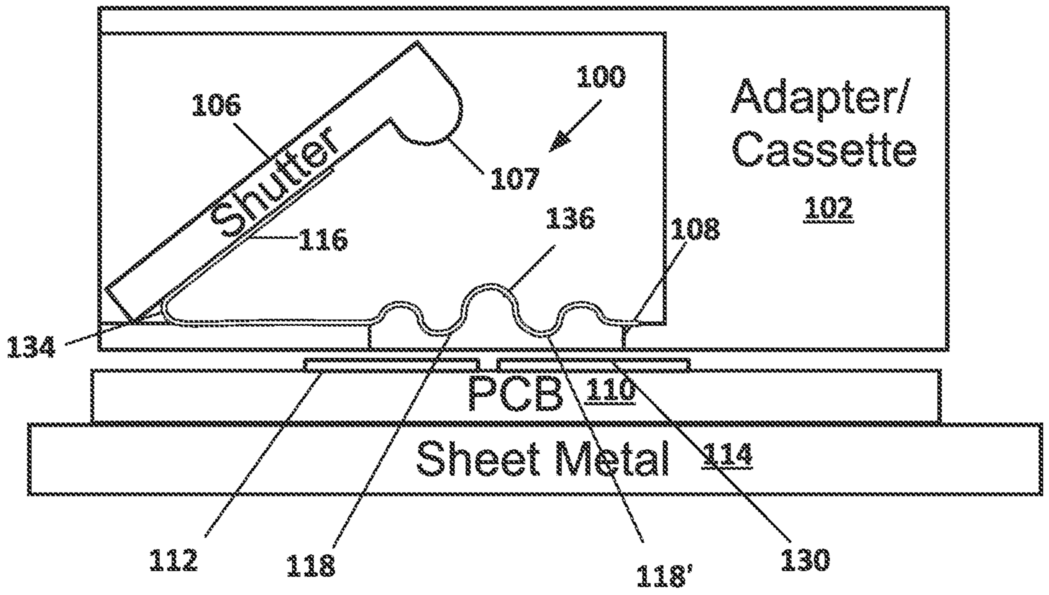
FIG. 6 is a schematic diagram showing the adapter of FIG. 1, but with a second example type of contact of a presence detection circuit.
Figure 7:
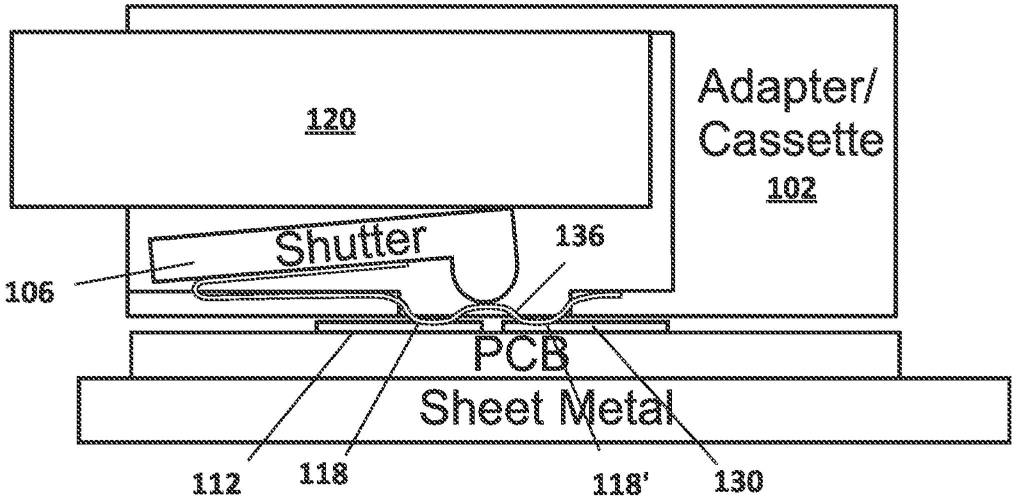
FIG. 7 shows the plug connector inserted in the port of FIG. 6, the plug connector opening the shutter and pressing the contact against two landing pads of a circuit board.

FIGS. 6-11 illustrate alternative designs for spring contact members 116. In FIGS. 6 and 7, the spring contact member 116 defines a first resilient portion 134 that provides a first biasing force to close the shutter 106. The spring contact member 116 also defines a second resilient portion 136 that provides a second biasing force to press the contact surfaces 118, 118' against the respective landing pads 112, 130. In the example shown, the second resilient portion 136 extends over the window 108 so that the first contact surface 118 aligns with the first landing pad 112 and the second contact surface 118' aligns with the second landing pad 130.

When the shutter 106 is disclosed in the closed position, the contact surfaces 118, 118' are spaced from the landing pads 112, 130. In certain examples, the shutter 106 includes a pressing member 107 that engages the second resilient portion 136 when the shutter is disposed in the open position. When the pressing member 107 engage the second resilient portion 136, the second resilient portion 136 presses the contact surfaces 118, 118' against the respective landing pads 112, 130.

Figure 8:
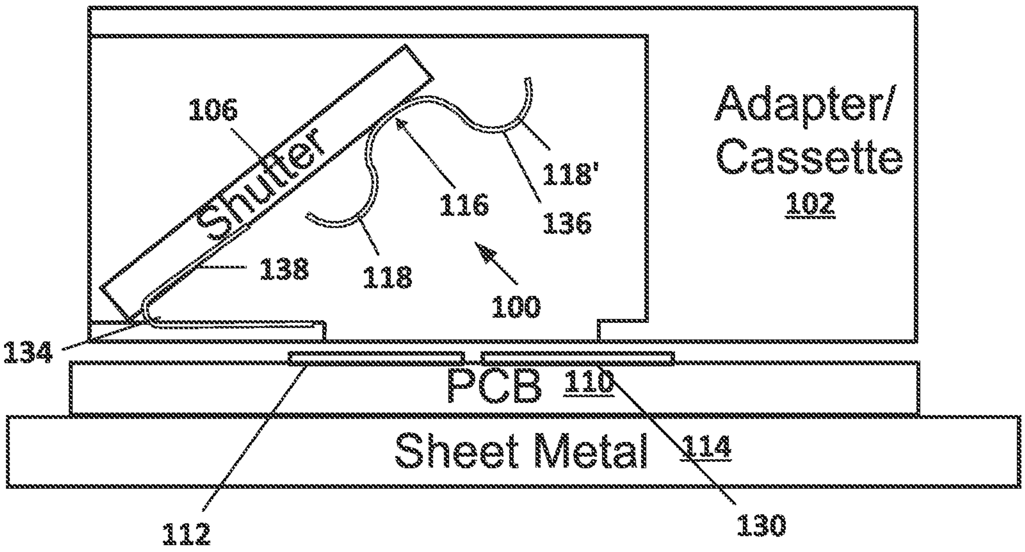
FIG. 8 is a schematic diagram showing the adapter of FIG. 1, but with a third example type of contact of a presence detection circuit.
Figure 9:
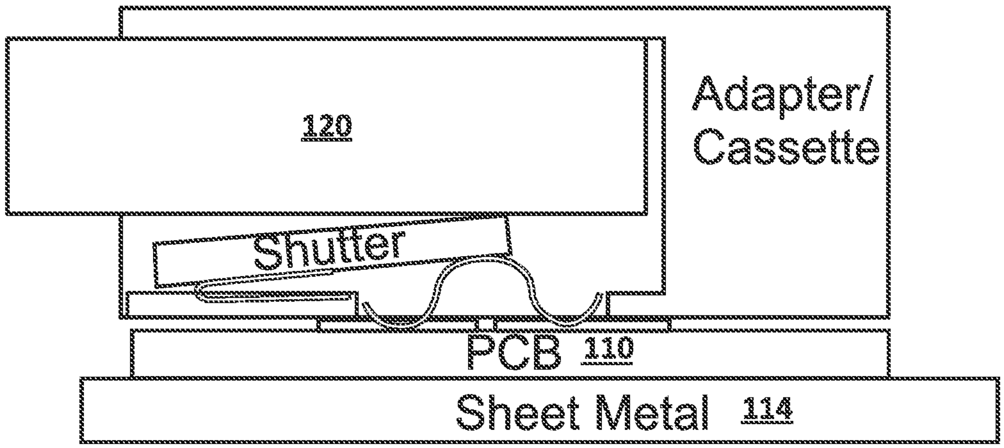
FIG. 9 shows the plug connector inserted in the port of FIG. 8, the plug connector opening the shutter and pressing the contact against two landing pads of a circuit board.

In FIGS. 8 and 9, each shutter 106 is coupled to two spring contact members 116, 138. A first of the spring contact members 116 defines the one or more contact surfaces 118, 118' that electrically connect to the landing pads 112, 130. In certain examples, the spring contact member 116 includes a resilient section 136 that biases the contact surfaces 118, 118' towards the landing pads 112, 130. In the example shown, the spring contact member 116 defines a first contact surface 118 that aligns with the first landing pad 112 and a second contact surface 118' that aligns with the second landing pad 130.

In certain examples, the spring contact member 116 is fully mounted to the shutter 106 to move in unison with the shutter 106 as the shutter 106 moves between the closed and open positions. In certain examples, a second of the spring contact members 138 includes a resilient portion 134 that biases the shutter 106 to the closed position. The second spring contact member 138 is separate from the first spring contact member 116. The second spring contact member 138 has a first portion mounted to the body 102 and a second portion mounted to the shutter 106.

Figure 10:
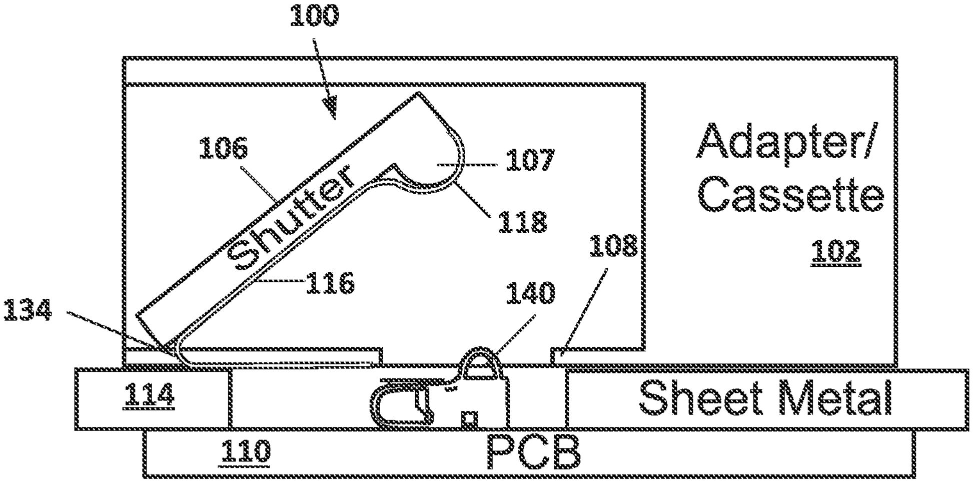
FIG. 10 is a schematic diagram showing the adapter of FIG. 1, but with a fourth example type of contact of a presence detection circuit.
Figure 11:
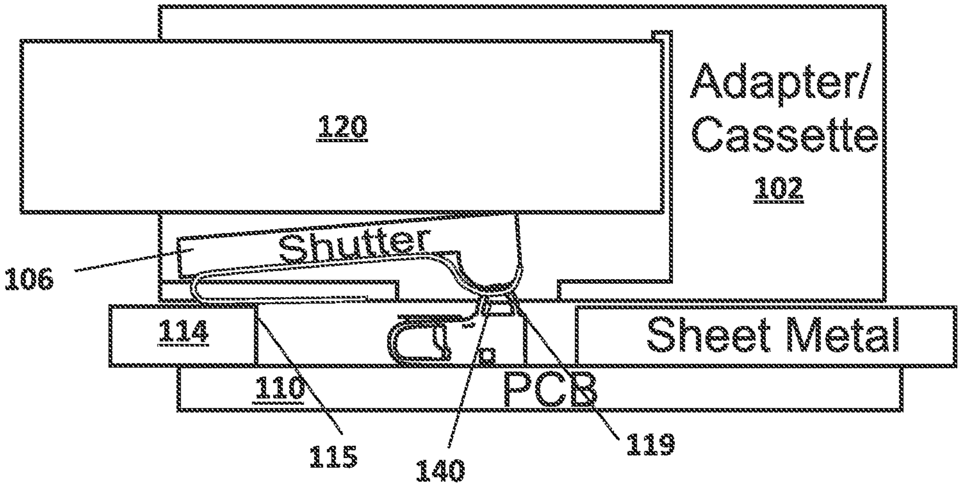
FIG. 11 shows the plug connector inserted in the port of FIG. 10, the plug connector opening the shutter and pressing the contact against a secondary contact mounted to a circuit board.

In FIGS. 10 and 11, the landing pads 112, 130 are replaced with a secondary spring contact 140 mounted to the circuit board 140. The spring contact 116 extends over an interior portion of the shutter 106 and defines a contact surface 118 configured to engage the secondary spring contact 140 through the window 108 when the shutter 106 is disposed in the open position. In the example shown, the spring contact 116 defines the resilient section 134 biasing the shutter 106 to the closed position. In the example shown, the contact surface 118 of the spring contact member 116 extends over a pressing member 107 that protrudes inwardly from a remainder of the shutter 106.

In the example shown, the body 102 defining the port 104 is mounted to the substrate 114, which defines a window 115 that at least partially aligns with the window 108 defined by the body 102. The circuit board 110 is mounted below the substrate 114 and is accessible from the interior of the body 102 through the windows 108, 115. In the example shown, the secondary spring contact member 140 extends from the circuit board 110, through the substrate window 115, towards the window 108 of the body 102. In some examples, the secondary spring contact member 140 extends through the window 108 and into an interior of the body 102. In other examples, the secondary contact member 140 is disposed external of the body 102 and the pressing member 107 of the shutter 106 extends through the window 108 so that the contact surface 118 engages the secondary contact member 140.

Figure 12:
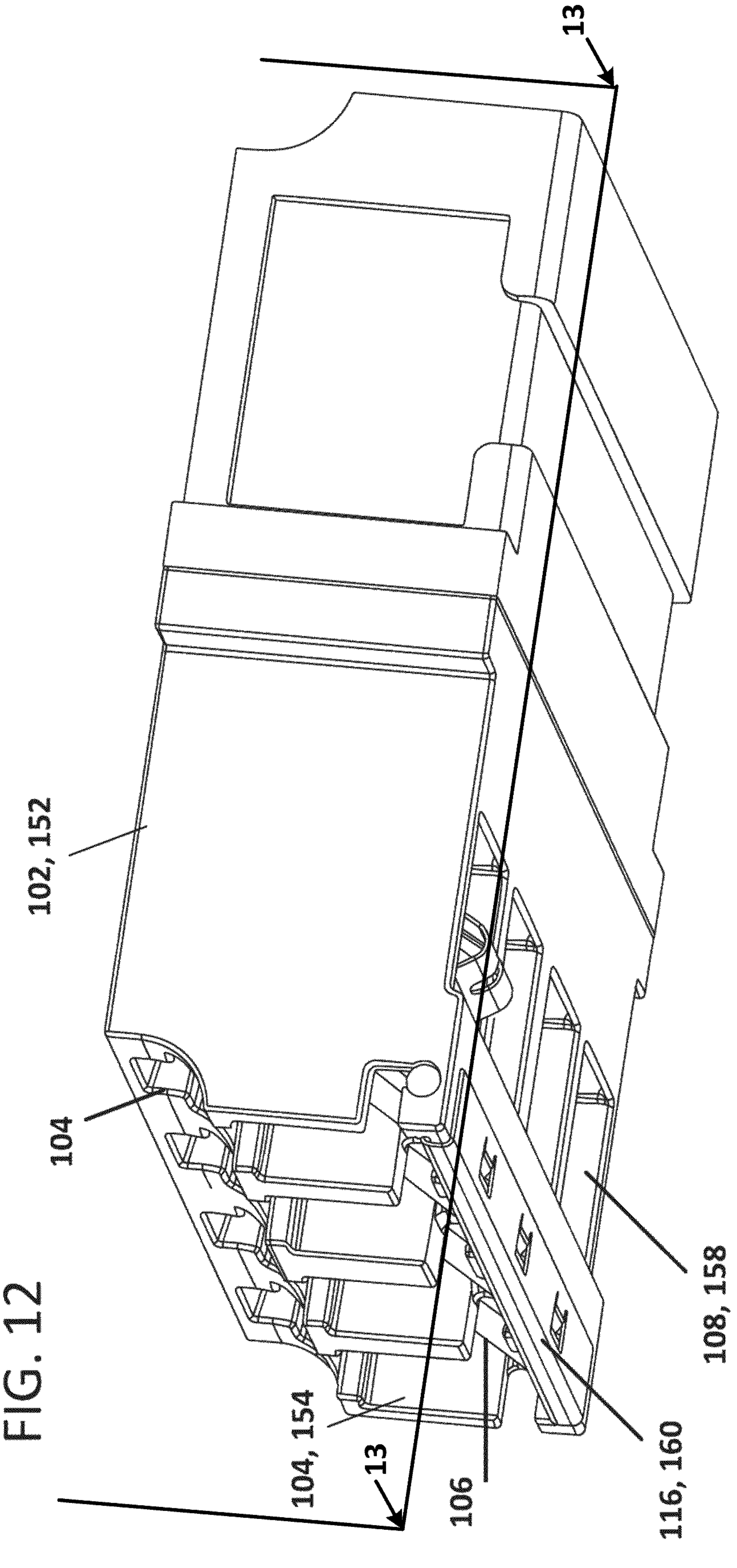
FIG. 12 is a bottom perspective view of an example adapter defining a plurality of ports, at least some of the ports being closed by a shutter carrying a contact for a detection circuit.
Figure 13:
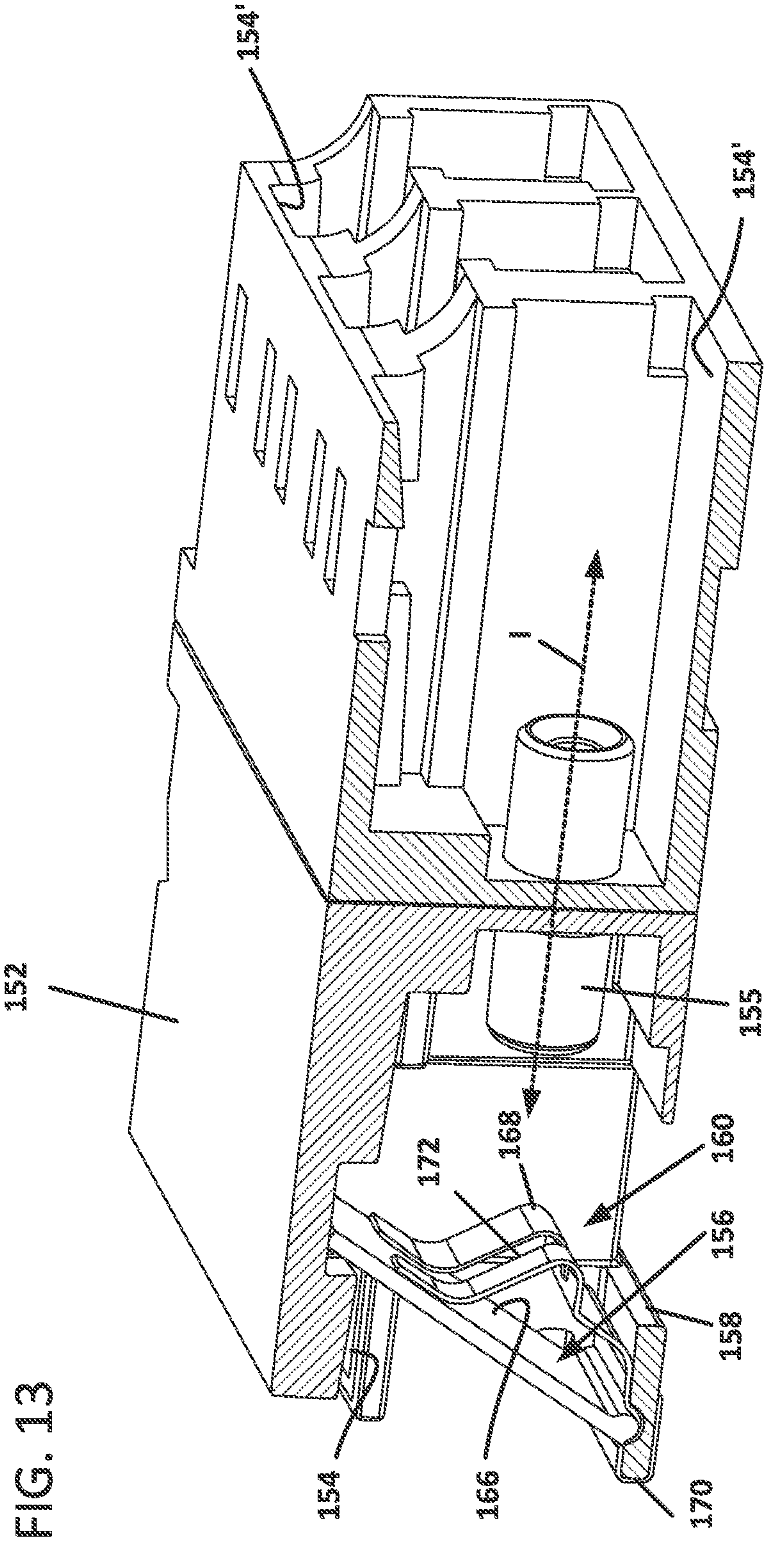
FIG. 13 is a perspective view of a longitudinal cross-section taken of the adapter along the 13-13 plane of FIG. 12.
Figure 14:
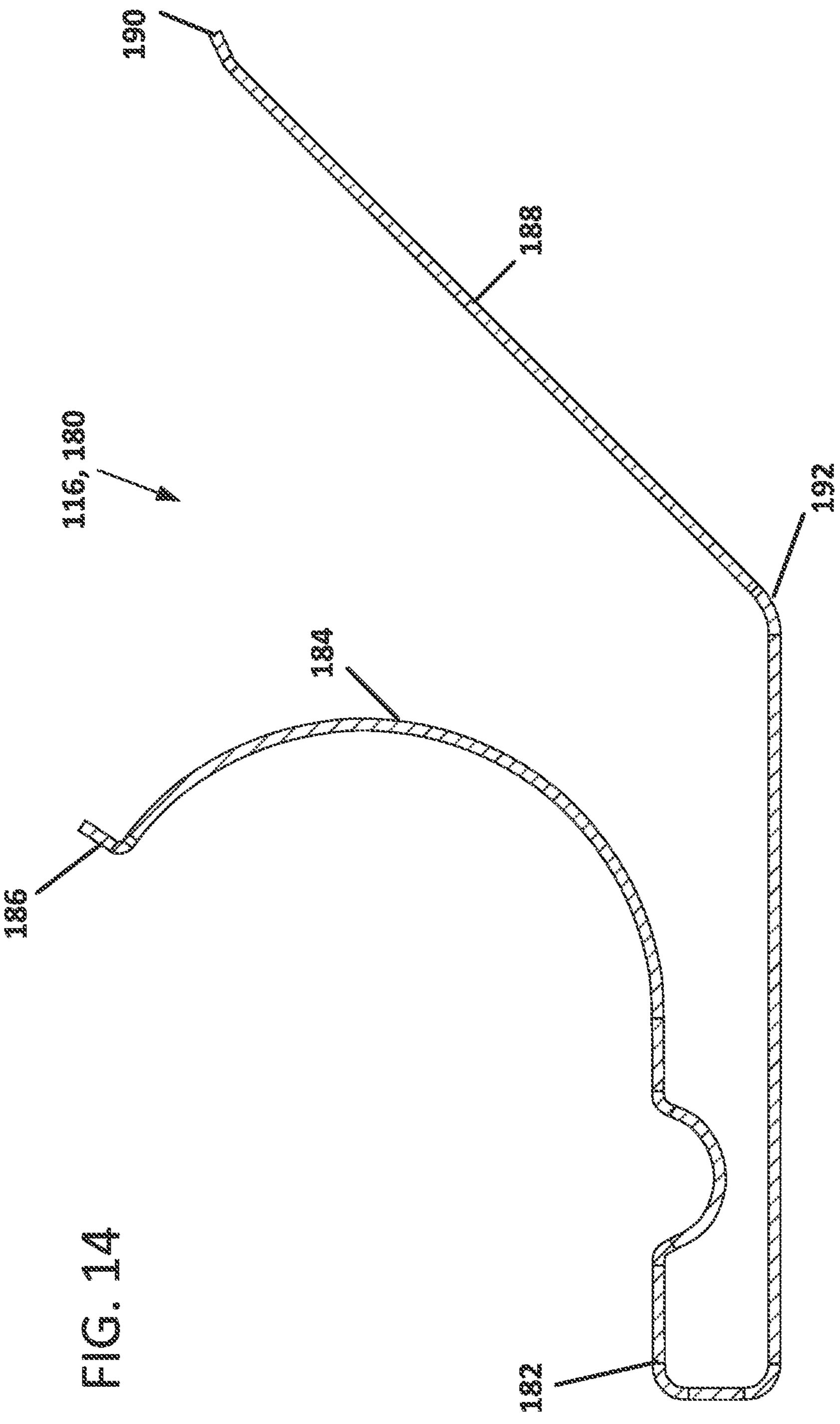
FIG. 14 is a side elevational view of another example contact suitable for use with the shutter and adapter of FIG. 12.

FIGS. 12-13 illustrate another example implementation of a port detector 100 disposed at ports 104 of a body 102. In certain implementations, the body 102 includes an optical adapter body 152 defining one or more ports 154 at which respective plug connectors can be disposed. The adapter block 152 also defines a respective number of corresponding mating ports 154' at which mating plug connectors can be received. In the example shown, the adapter body 152 defines four LC ports 154, 154' at each side. In other examples, the adapter body 152 may define a greater or lesser number (e.g., one, two, six, eight, ten, twelve, sixteen, twenty-four, thirty-six, forty-eight, etc.) of ports 154, 154' at each side of the adapter body 152. In some implementations, each of the ports 154, 154' is configured to receive a single-fiber plug connector (e.g., an LC plug connector, an SC plug connector, etc.). In other implementations, each of the ports 154, 154' is configured to receive a multi-fiber plug connector (e.g., an MPO plug connector, and SN plug connector, and MDC plug connector, etc.).

In some implementations, the adapter block 152 also includes a respective number of alignment devices 155 disposed between corresponding pairs of ports 154, 154'. The alignment devices 155 align ferrules or fibers of optical plug connectors received at the corresponding ports 154, 154' along an alignment axis I (FIG. 13). For example, the alignment device 155 may include or hold a split sleeve that receives ferrules of the plug connectors (e.g., LC plug connectors) received at the ports 154, 154'. In other implementations, the adapter body 152 does not include alignment structure. For example, ferrules of MPO plug connectors can mate together without intervening adapter structure.

A shutter 156 is disposed at a port 154 of the adapter body 152. In some implementations, a separate shutter 156 is disposed at each port 154. In other implementations, two shutters 156 can be coupled together to move as a unit (e.g., at a duplex LC port). In the example shown, shutters 156 are disposed only at ports 154 at a first side of the adapter body 152 and not at the mating ports 154' at an opposite second side of the adapter body 152. In other examples, however, shutters 156 can be disposed at each port 154, 154' of the adapter body 152. Each shutter 156 is pivotally movable between a closed position and an open position. In certain examples, the shutter 156 includes hinge pins 164 (see FIG. 20) that snap into a groove 162 or holes to pivotally mount the shutter 156 to the adapter body 152.

When disposed in the closed position, the shutter 156 extends between the port 154 and the alignment device 155 (or fibers of any plug connector received at the mating port 154'). Accordingly, the shutter 156 can be configured to block light (e.g., laser light) emitted from a plug connector received at the mating port 154'. In certain implementations, the shutter 156 may be configured to be transparent to certain wavelengths of light (e.g., in the visible light spectrum). In certain implementations, the shutter 156 may be formed from a material that disperses certain wavelengths of light (e.g., in the visible light spectrum). Accordingly, certain wavelengths of light (e.g., visible light) can be used to identify a port 154 from an exterior of the adapter body 152.

A spring contact member 160 is mounted to the adapter body 152 to bias the shutter 156 to a closed position within the port 154. The spring contact member 160 also defines a contact surface 168 that is movable with the shutter 156 when the shutter 156 moves between the closed and open positions. The adapter body 152 defines windows 158 extending between an interior of the adapter body 152 and an exterior of the adapter body 154. When the shutter 156 is disposed in the open position, the contact surface 168 of the spring contact member 160 passes through the window 158 to a landing pad (or secondary spring contact) of a circuit board disposed thereat.

In certain implementations, the spring contact member 160 includes a first section 170 that mounts to the adapter body 152 and a second section 172 that defines the contact surface 168. In the example shown, the first section 170 wraps around an exterior of the adapter body 152. In other examples, the first section 170 may be otherwise coupled to the body 152. In certain examples, an end of the second section 172 engages the interior surface 166 of the shutter 156 to bias the shutter 156 to the closed position. In the example shown, the second section 172 extends across the alignment axis I. However, the second section 172 defines a slit 172 or separation that aligns with the alignment axis I so that light from a fiber in the mating port 154' can shine through the slit 172 and to the shutter 156.

FIGS. 14-17 illustrate another example implementation 180 of a spring contact member 116 suitable for use with the adapter body 152 shown in FIGS. 12-13. The spring contact member 180 includes a mounting portion 182 that couples the spring contact member 180 to the adapter body 152 or other body 102. The spring contact member 180 includes a first resilient section 184 that extends from the mounting portion 182 to a first free end 186. The spring contact member 180 also includes a second resilient section 188 that extends from the mounting portion 182 to a second free end 190. The second resilient section 188 defines a contact surface 192.

Figure 15:
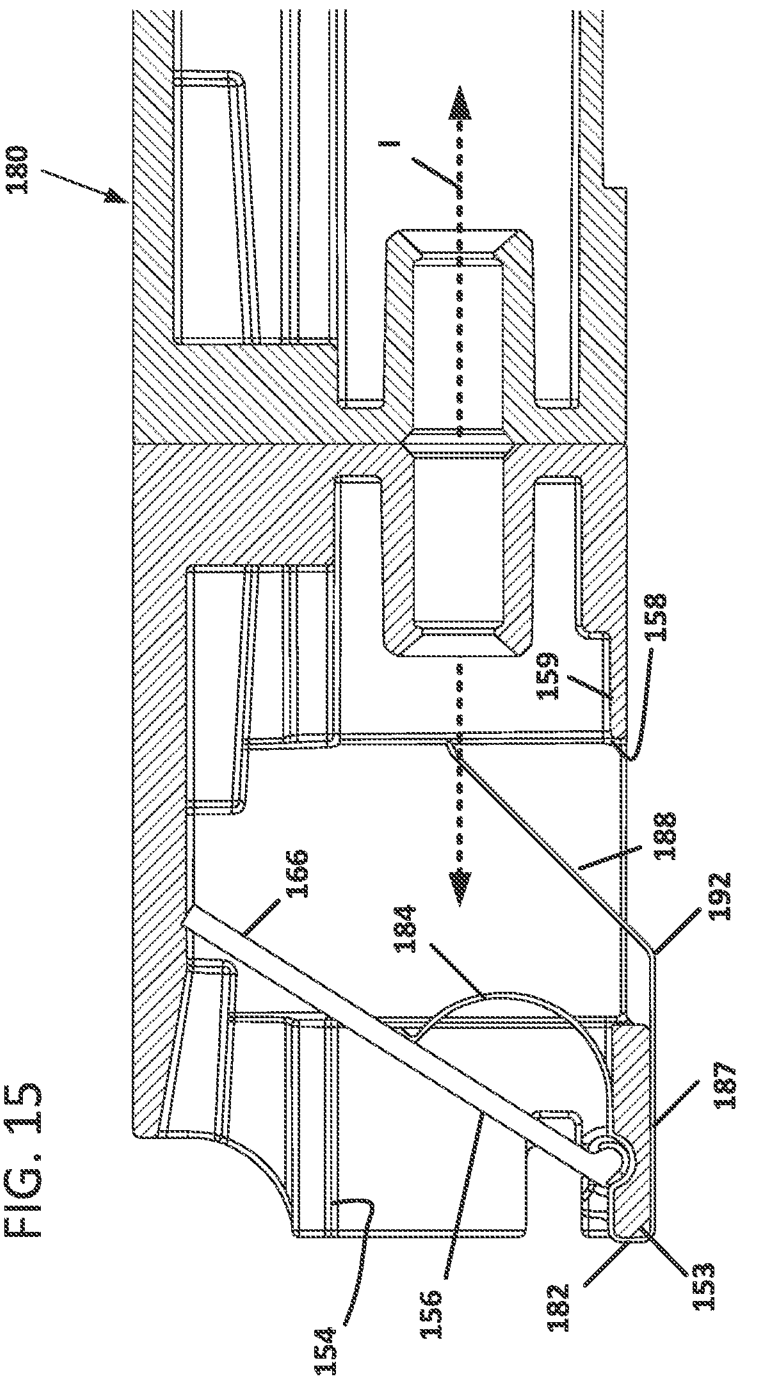
FIG. 15 is a cross-sectional view of the adapter of FIG. 12 having the contact of FIG. 14 mounted to a shutter, the cross-sectional view being taken along the 13-13 plane of FIG. 12.

As shown in FIG. 15, the first free end 186 of the first resilient section 184 engages the interior surface 166 of the shutter 156. The first resilient section 184 applies a first biasing force to the shutter 156 to bias the shutter 156 to the closed position. In certain examples, the first resilient section 184 defines a convex curve extending into the interior of the body 152 from the shutter interior surface 166.

The second resilient section 188 extends across at least a portion of the window 158. In some implementations, the second resilient section 188 extends completely across the window 158 to a ledge 159 bordering the window 158 within the adapter body 152. In other examples, the second resilient section 188 extends across a majority of the window 158, but does not engage a ledge. The contact surface 192 is aligned with the window 158. In certain implementations, the contact surface 192 is formed at a flexed portion of the second resilient section 188. In certain implementations, the second resilient section 188 extends upwardly across the alignment axis I. In certain examples, the second resilient section 188 defines a slit through which light may pass as will be shown and discussed in more detail herein.

The mounting portion 182 of the spring contact member 180 is shown wrapped over an exterior edge 153 of the adapter body 152. In certain examples, the mounting portion 182 is disposed between the first resilient section 184 and the second resilient section 188. In certain implementations, the second resilient section 188 is disposed partially exterior of the adapter body 152 whereas the first resilient section 184 is disposed within the interior of the adapter body 152. In certain examples, a portion 187 of the second resilient section 188 disposed external to the adapter body 152 is flat (e.g., planar with a bottom surface of the adapter body 152) at least when the shutter is disposed in the closed position.

In certain examples, the second resilient section 188 extends through the window 158 from a bottom of the window 158 to a top of the window 158 and into the interior of the adapter body 152. In certain examples, the contact surface 192 is disposed external of the adapter body 152 even when the shutter 156 is disposed in the closed position. When the shutter 156 is disposed in the open position (e.g., see FIGS. 16 and 17), the interior surface 166 of the shutter 156 pushes the ends 186, 190 of both the first and second resilient sections 184, 188 towards the window 158.

In certain examples, at least some of the previously internal portion of the second resilient member 188 passes through the window 158 to an exterior of the adapter body 152. In the example shown, the end 190 of the second resilient section 188 is sandwiched between the shutter interior surface 166 and the ledge 159 within the adapter body 152. The second resilient section 188 is slid through the window 158 to press the contact surface 192 outwardly from the adapter body 152 at the window (e.g., to mate with a landing pad or secondary spring contact member).

Figure 16:
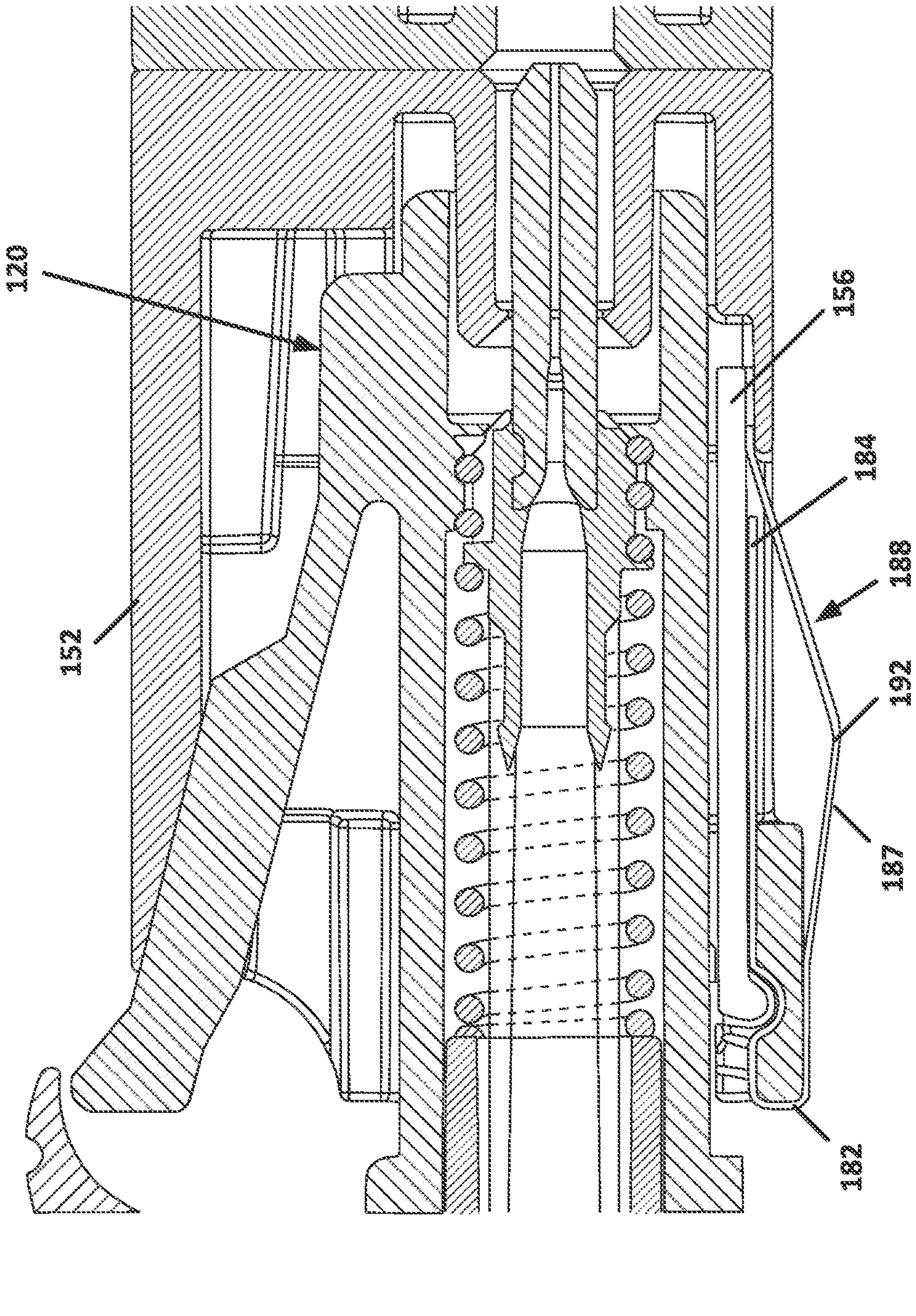
FIG. 16 shows a plug connector received in the port of the adapter of FIG. 15, the plug connector pressing the shutter open and pressing the contact external of the adapter.
Figure 17:
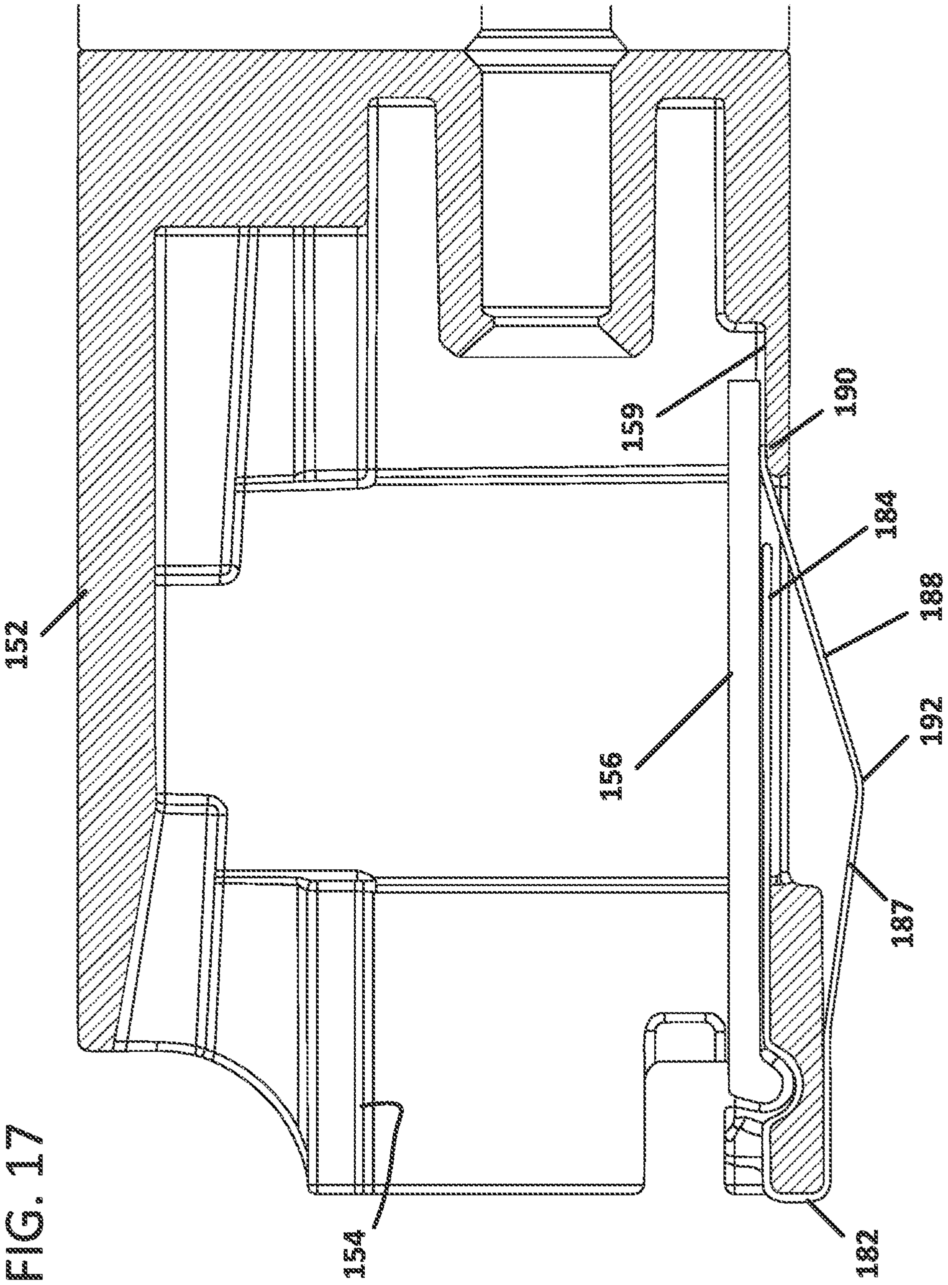
FIG. 17 shows the adapter, shutter, and contact of FIG. 16 with the plug connector removed for ease in viewing.
Figure 18:
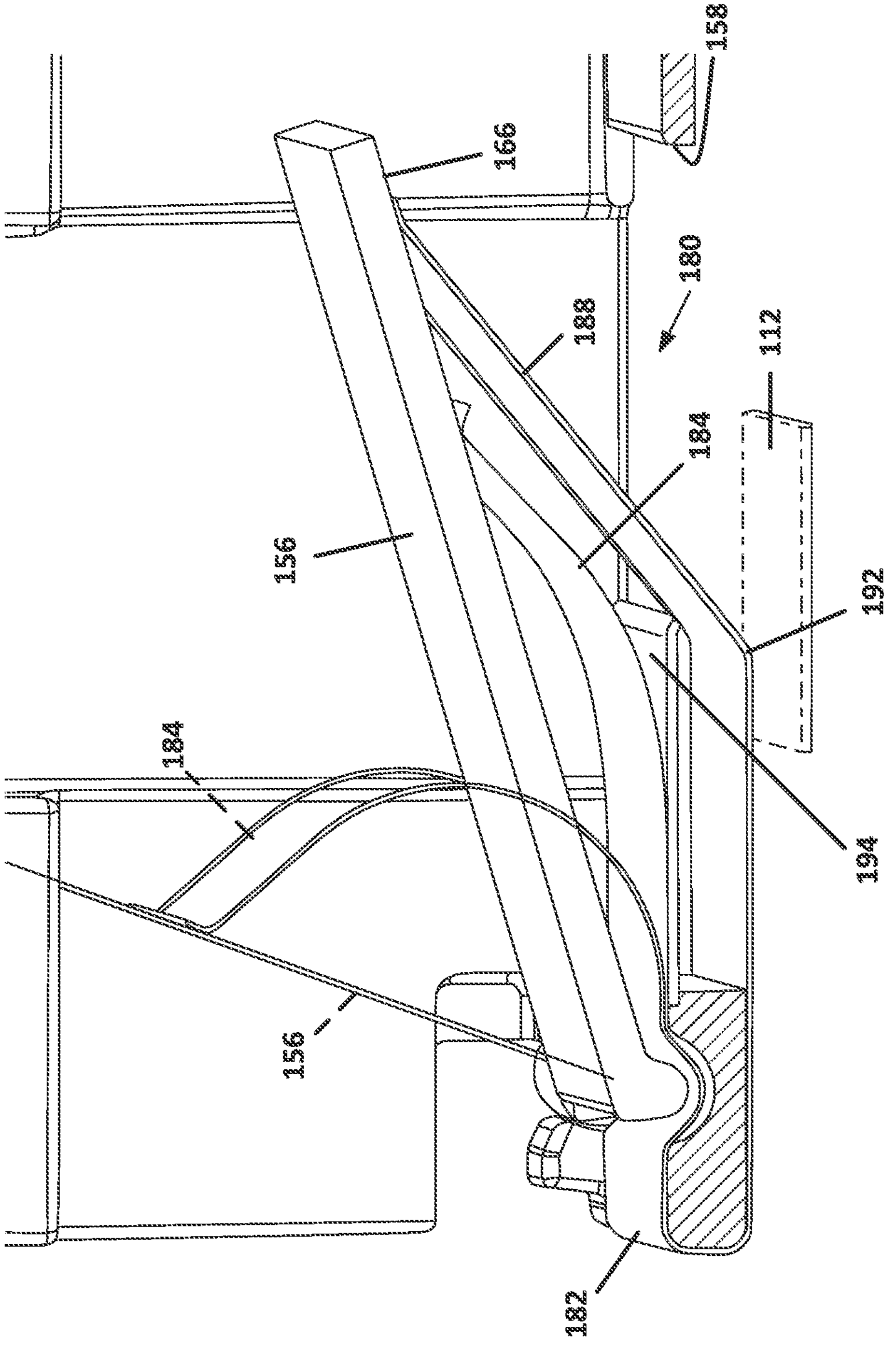
FIG. 18 is a perspective view of another example contact mounted within the adapter body of FIG. 11, the contact being actuatable by the shutter, the shutter and contact being shown part-way between the open and closed positions, wherein an indication of the closed shutter and contact positions are shown in outline.
Figure 19:
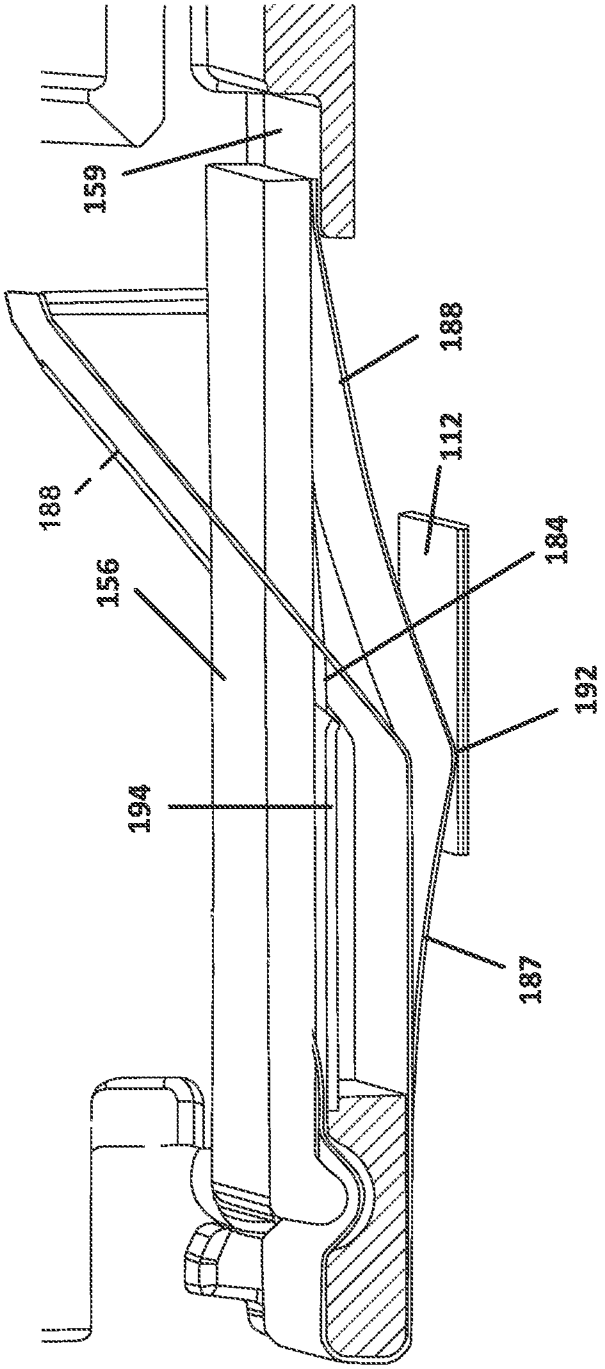
FIG. 19 is a perspective view of the contact and shutter of FIG. 18 shown in the open position with the contact engages the landing pad.

FIGS. 18 and 19 illustrate a variation on the adapter body 152 of FIGS. 15-17. The adapter body 152 of FIGS. 18 and 19 includes a ledge 194 that extends partially across the window 158. The ledge 194 extends between at least a portion of the first resilient section 184 and at least a portion of the second resilient section 188. In the example shown, the ledge 194 extends beyond the contact surface 192 so that the ledge 194 is disposed between the contact surface 192 and the interior of the adapter body 152. As the shutter 156 is moved from the closed position (see dashed lead lines) towards the open position, the first resilient section 184 compresses against the ledge 194 to better bias the shutter 156 towards the closed position upon release of the shutter 156. The ledge 194 inhibits the first resilient portion 184 from passing through the window 158 or contacting the second resilient portion 188.

Figure 20:
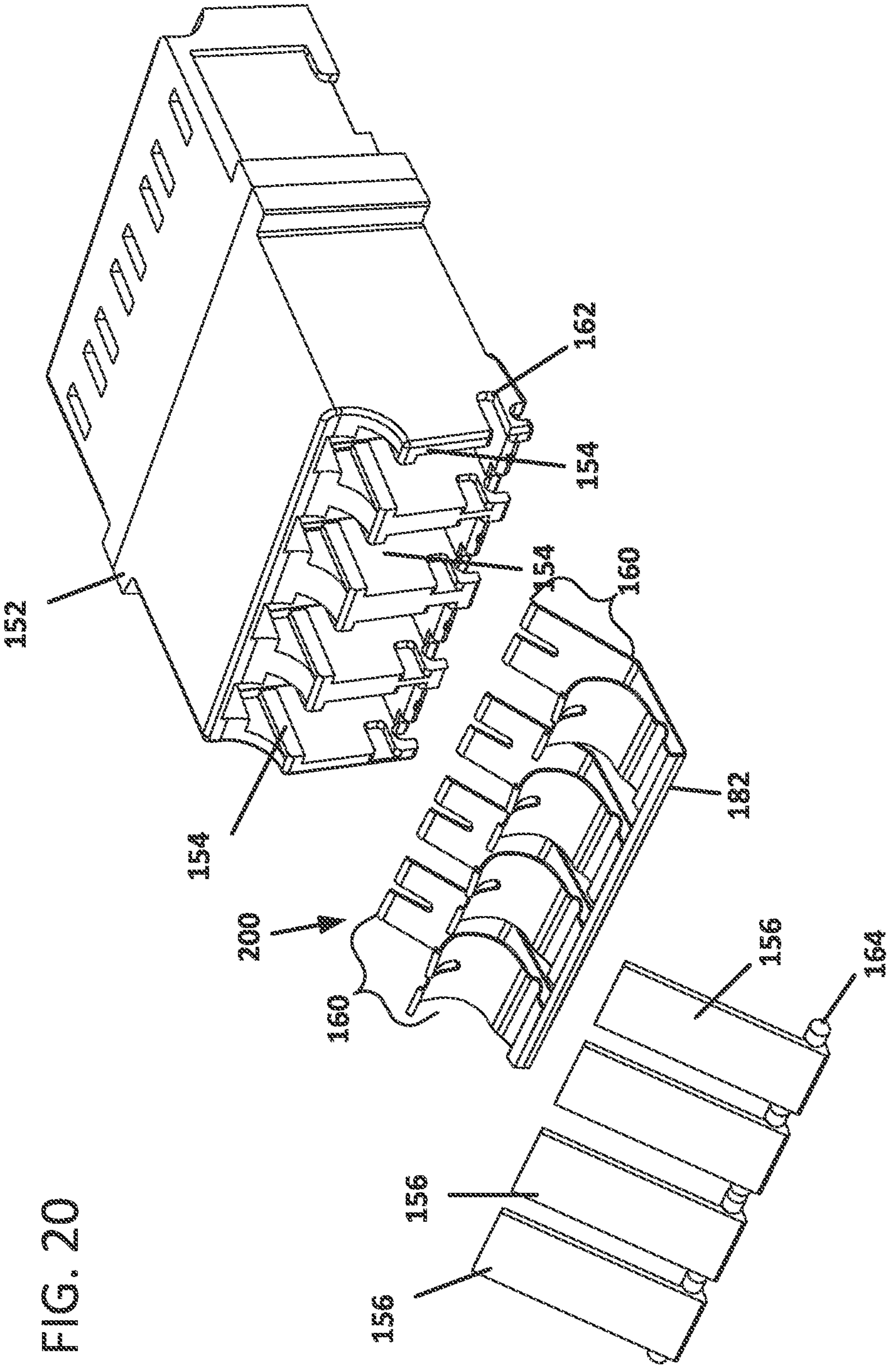
FIG. 20 is a perspective view of an example multi-port adapter with port shutters and a detection circuit contact arrangement shown exploded outwardly from the adapter.
Figure 21:
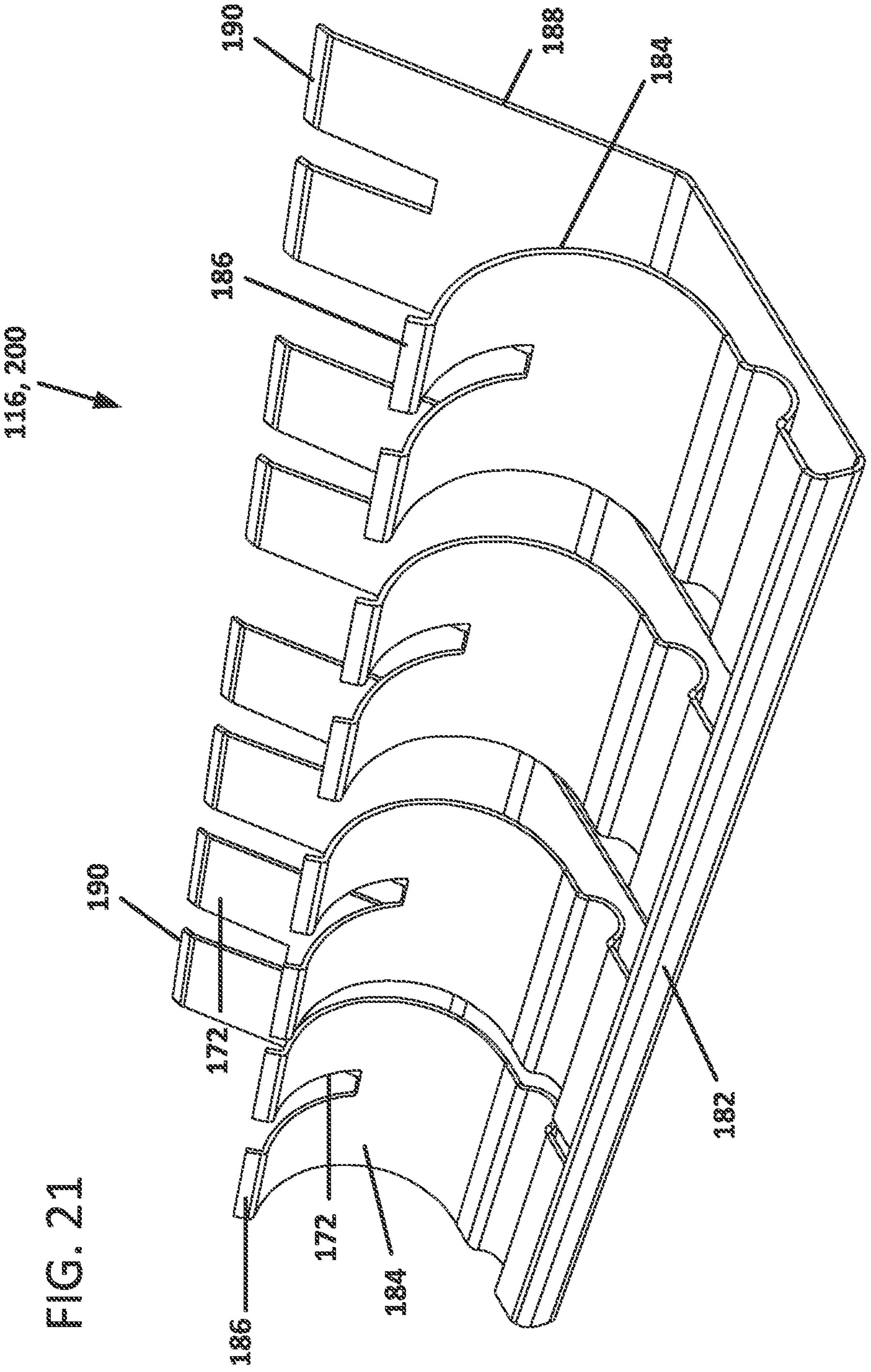
FIG. 21 is a first perspective view of the detection circuit contact arrangement of FIG. 20.
Figure 22:
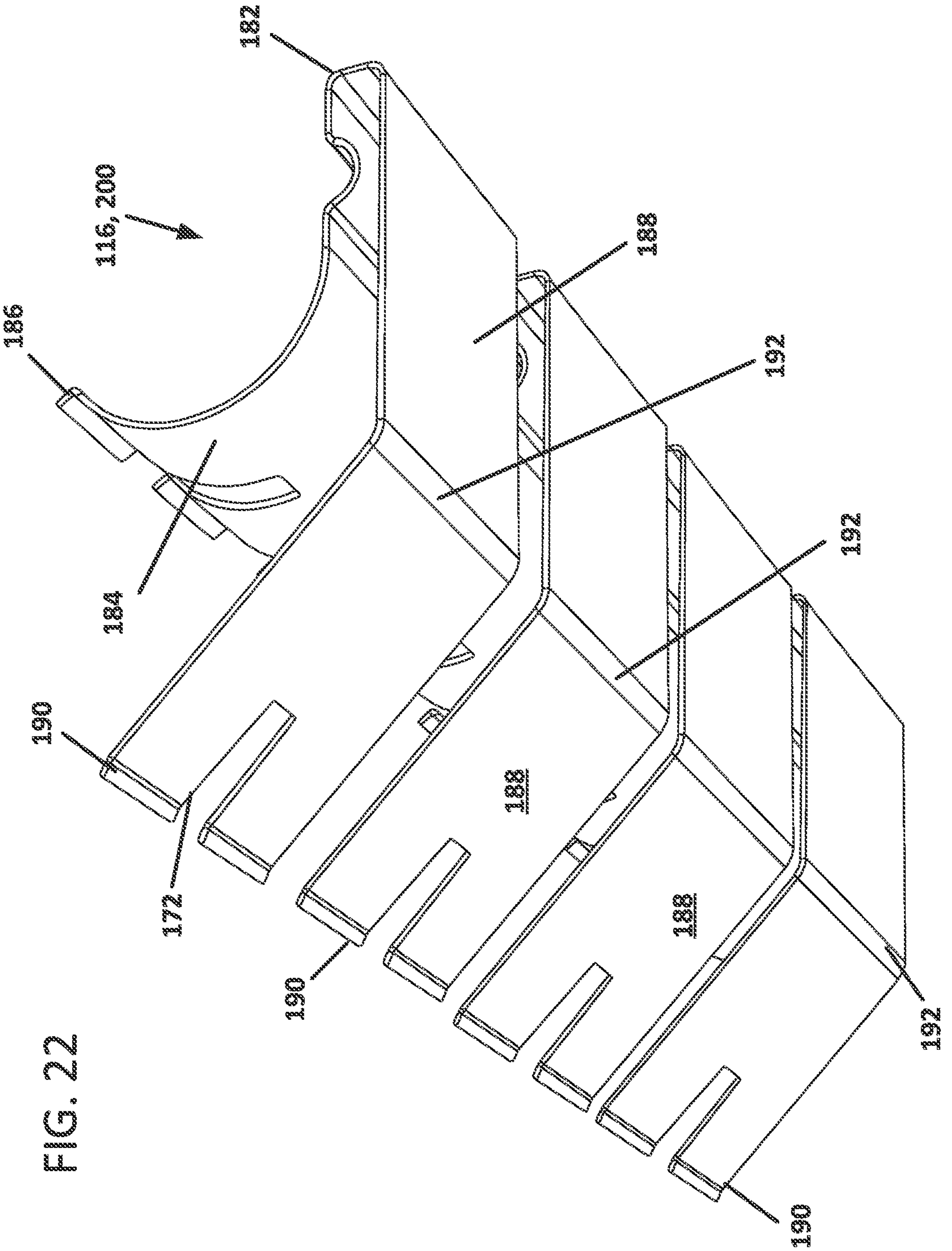
FIG. 22 is a second perspective view of the detection circuit contact arrangement of FIG. 20.

FIGS. 20-22 illustrate one example spring contact arrangement 200 suitable for use with multiple ports 154 of the adapter body 152. In certain implementations, the spring contact arrangement 200 includes two or more spring contact members 160 mechanically connected together. For example, the spring contact members 160 can be formed from a common sheet of metal. In the example shown, the spring contact members 160 are connected together at their mounting portions 182.

Figure 23:
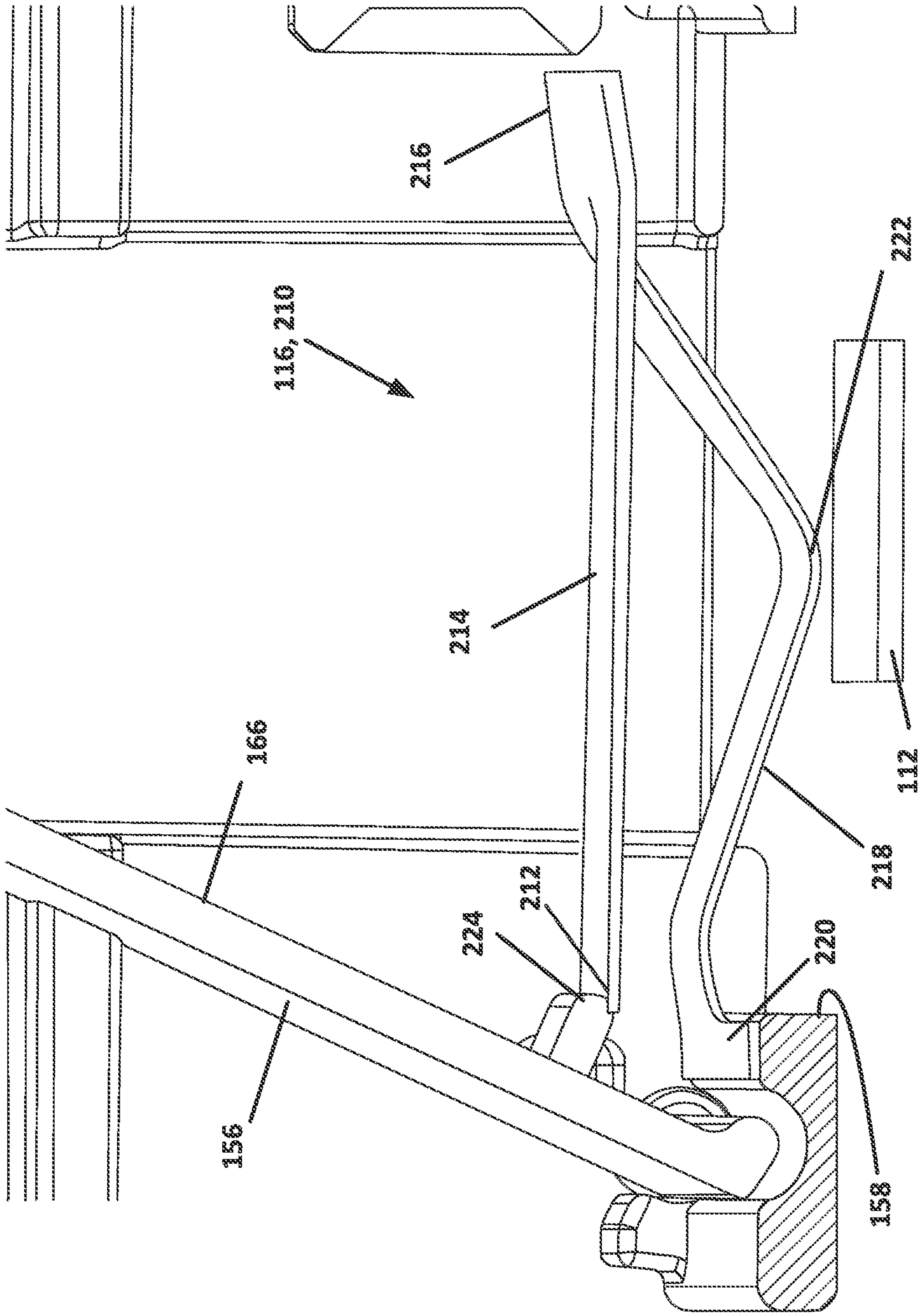
FIG. 23 is a perspective view of another example detection circuit contact mounted within a body having a port shutter shown in the closed position.
Figure 24:
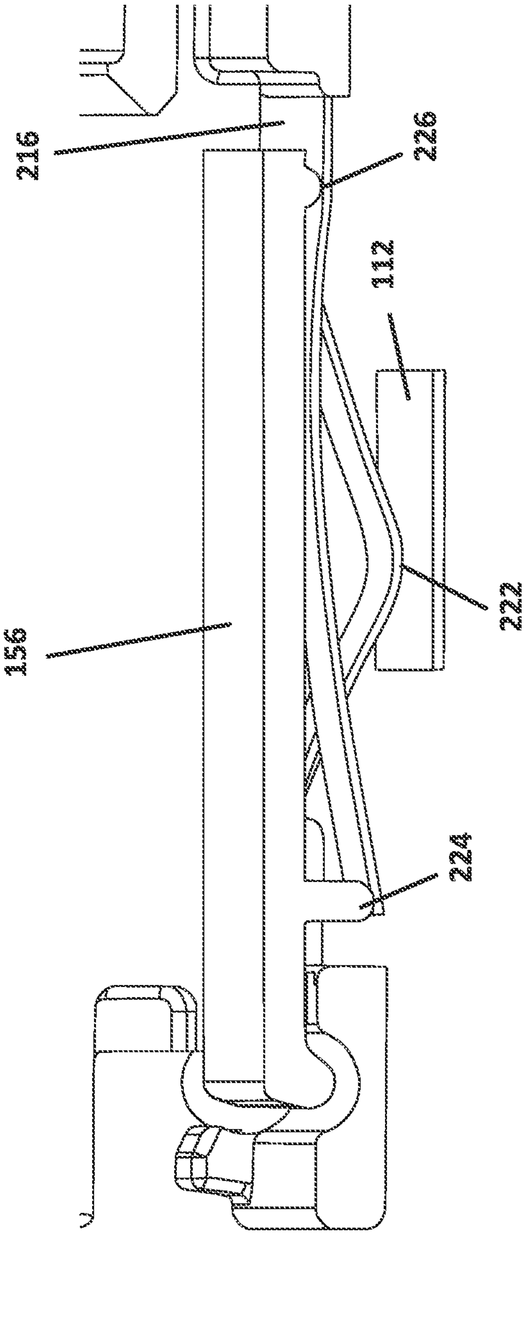
FIG. 24 shows the port shutter and detection circuit contact of FIG. 23 in the open position.

FIGS. 23 and 24 show another alternative implementation 210 of a spring contact member 116 suitable for use in a body 102 such as optical adapter 150. The spring contact member 210 includes a first beam 214 extending from a first end 212 to a resilient portion 216. The spring contact member 210 also includes a second beam 218 that extends from the resilient portion 216 to a second end 220. The second end 220 is mounted to the adapter body 152. The first end is coupled to a protrusion 224 on the inside surface 166 of the shutter 156. The resilient portion 216 is free floating.

In certain implementations, the entirety of the spring contact member 210 biases the shutter 156 to the closed position. For example, the first and second beams 214, 218 cooperate with the resilient portion 216 to provide a biasing force on the shutter 156. In certain examples, the second beam 218 is flexed to provide a second resilient portion. A contact surface 222 is defined at the second resilient portion.

When a plug connector is inserted into the port 154, the connector pushes the shutter 156 towards the window 158. The protrusion 224 presses against the first end 212 of the spring contact member 210 to deflect the resilient portion 216 towards the shutter 156. The shutter 156 also carries a second protrusion 226 at an opposite end of the shutter from the protrusion 224. The second protrusion 226 engages the resilient portion 216 of the spring contact member 210 when the shutter 156 is part-way to the open position. The second protrusion 226 presses the resilient portion 216 toward the window 158. When the shutter 156 is disposed in the open position (e.g., see FIG. 24), the shutter 156 extends generally flat (e.g., parallel with a bottom of the adapter). The second beam 218 extends from the fixed end 220 to the resilient portion 216, which has been moved by the shutter 156 to extend partially through the window 158. The contact surface 222 engages the landing pad 112 or secondary spring contact member through the window 158.

Figure 25:
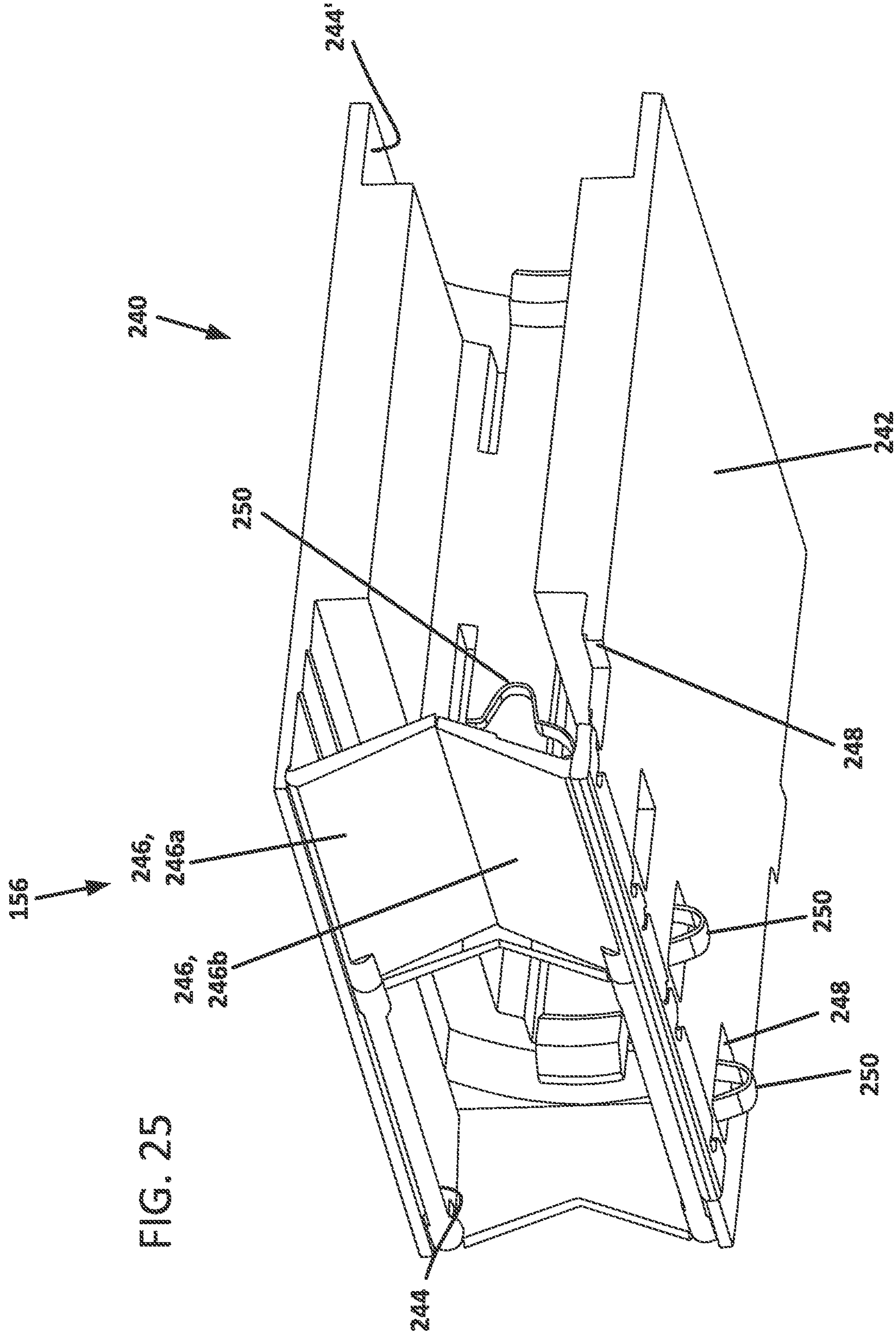
FIG. 25 is a perspective view of another example multi-port adapter having dual port shutters and a detection circuit contact arrangement.
Figure 26:
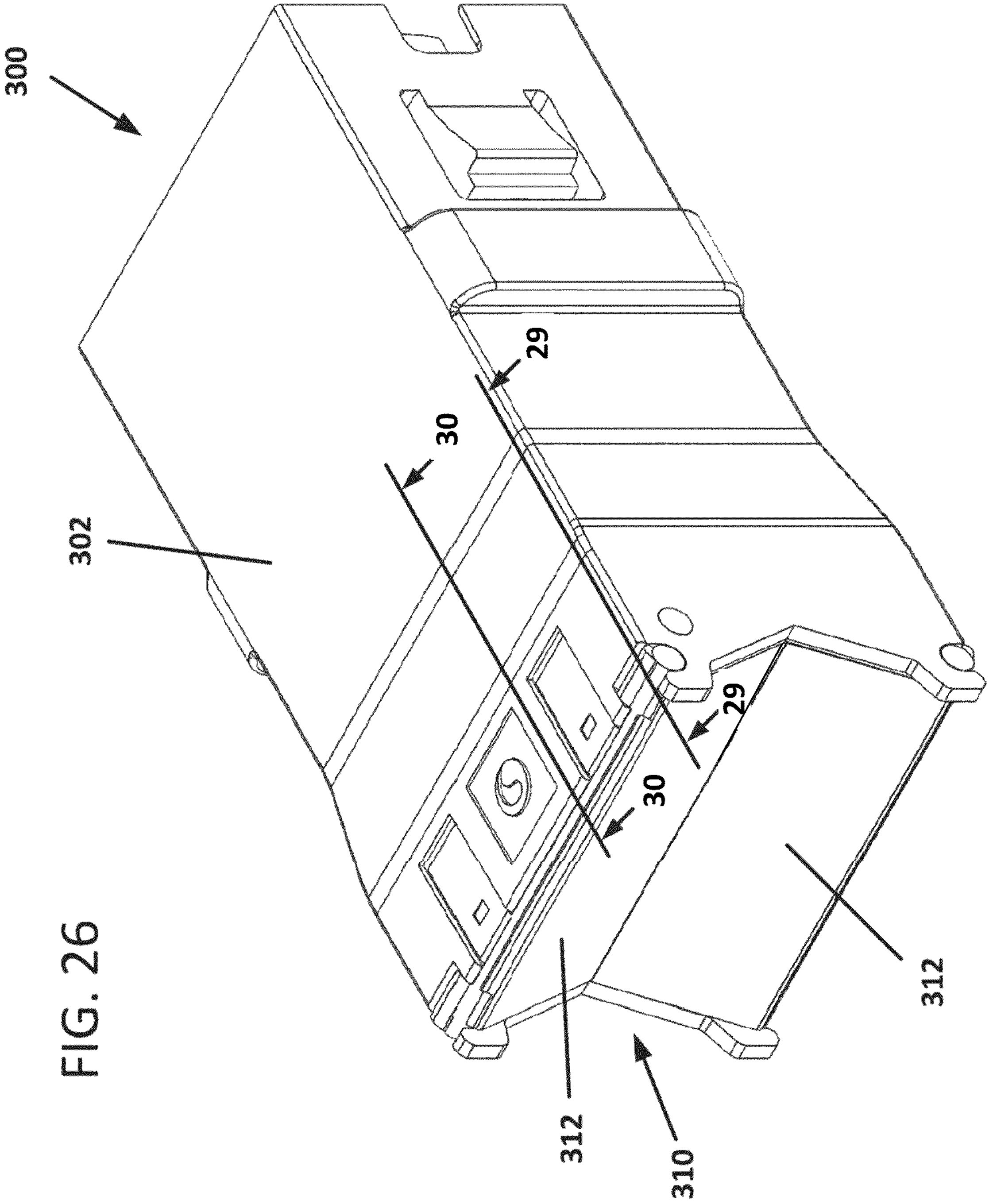
FIG. 26 is a perspective view of an example implementation of a port member configured to receive a multi-fiber plug connector.
Figure 27:
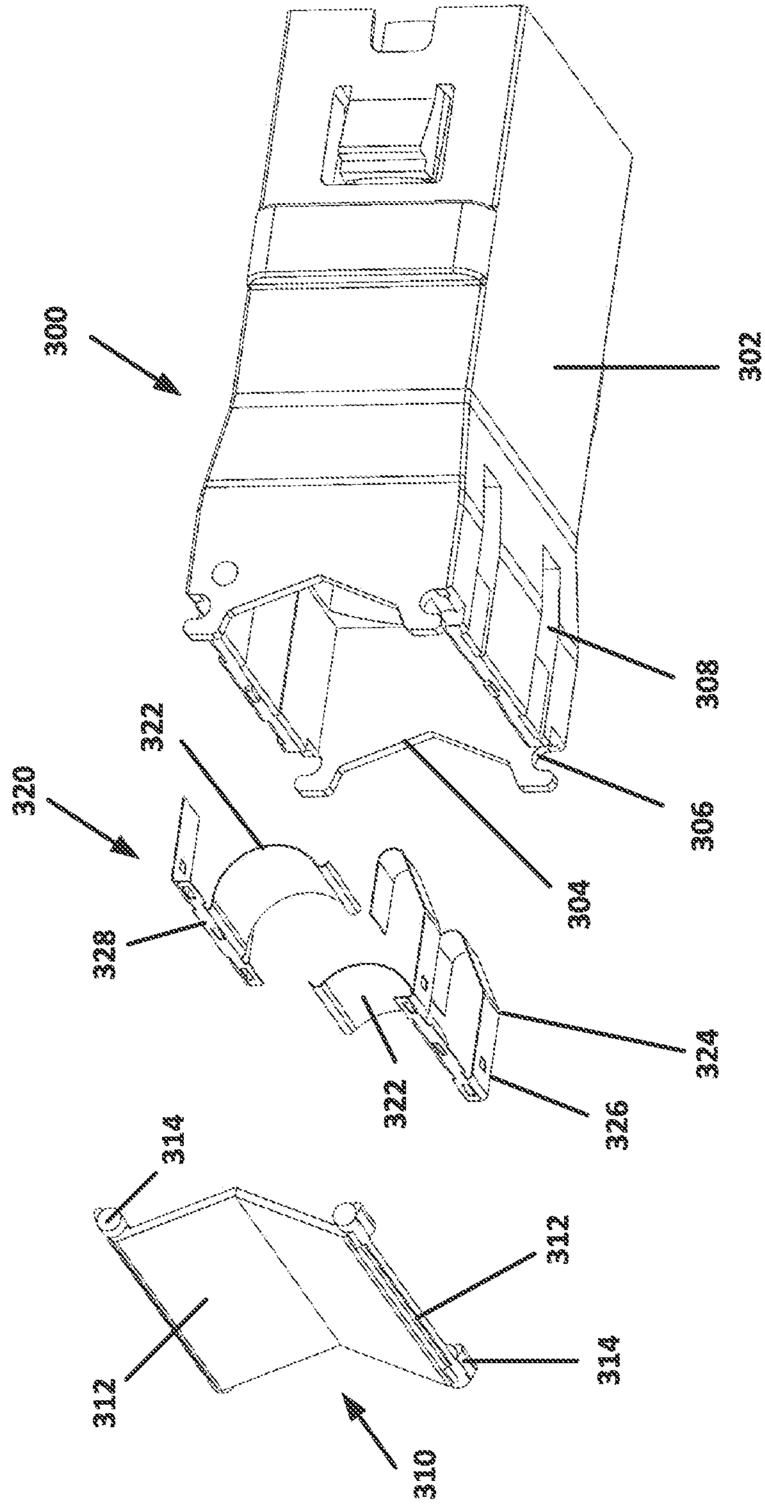
FIG. 27 is a perspective view showing the shutters and springs exploded outwardly from the port member of FIG. 26.

FIG. 25 illustrates a different adapter arrangement 240 suitable for use with any of the spring contact members 116, 160, 210 disclosed herein. The adapter arrangement 240 includes an adapter body 242 having dual shutters 246 at each port 244 on at least one side of the adapter body 242. In certain implementations, the adapter body 242 defines mating ports 244' aligned with the ports 244. In certain examples, the adapter body 242 does not include alignment devices between the ports 244, 244'. For example, the ports 244, 244' may be configured to receive multi-fiber plug connectors (e.g., MPO connectors).

The adapter body 242 also defines a window 248 leading to a circuit board. In certain examples, the dual shutters 246 include a first shutter **246*a* and a second shutter 246*b***.

Inserting a plug connector into one of the ports 244 pushes the first shutter 246*a* in a first direction away from the window 248 and the second shutter 246*b* in a second direction towards the window 248.

One or more spring contact members 250 are coupled to the second shutters 246*b*. In the example shown, the spring contact member 250 is fully disposed within the interior of the adapter body 242 when the second shutter 246*b* is disposed in the closed positon and extends partially out of the adapter body 242 through the window 248 when the second shutter 246*b* is disposed in the open position. In some implementations, each second shutter 246*b* carries two spring contact members 250 that are electrically coupled together. Each spring contact member 250 aligns with a respective landing pad on the circuit board. Accordingly, moving the shutter 246*b* to the open position electrically couples the landing pads, thereby closing or shorting a detection circuit. In other examples, the spring contact members 250 may be substituted out for any of the spring contact members 116, 160, 210 discussed herein.

Figure 31:
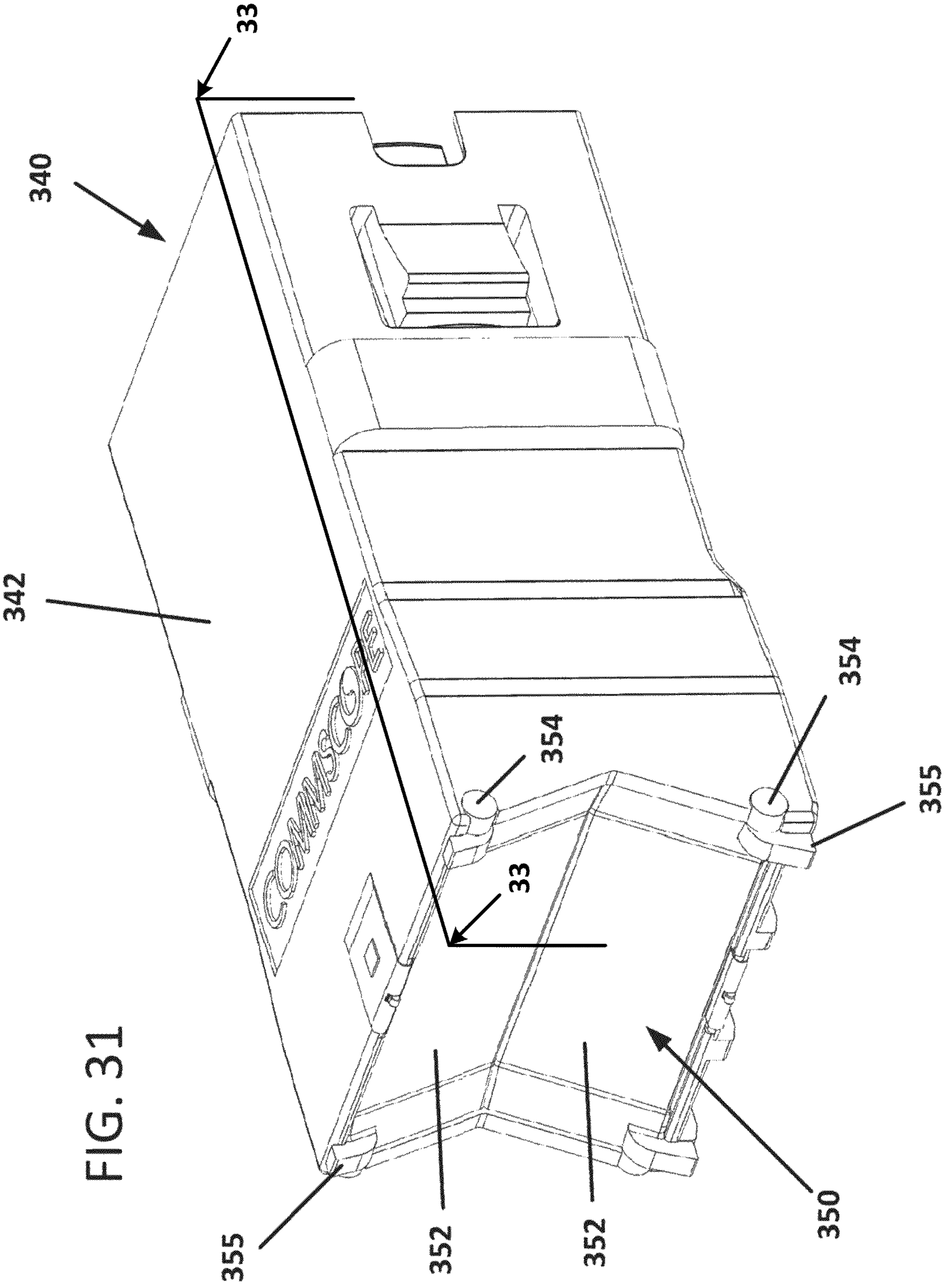
FIG. 31 is a perspective view of another example implementation of a port member configured to receive a multi-fiber plug connector.
Figure 32:
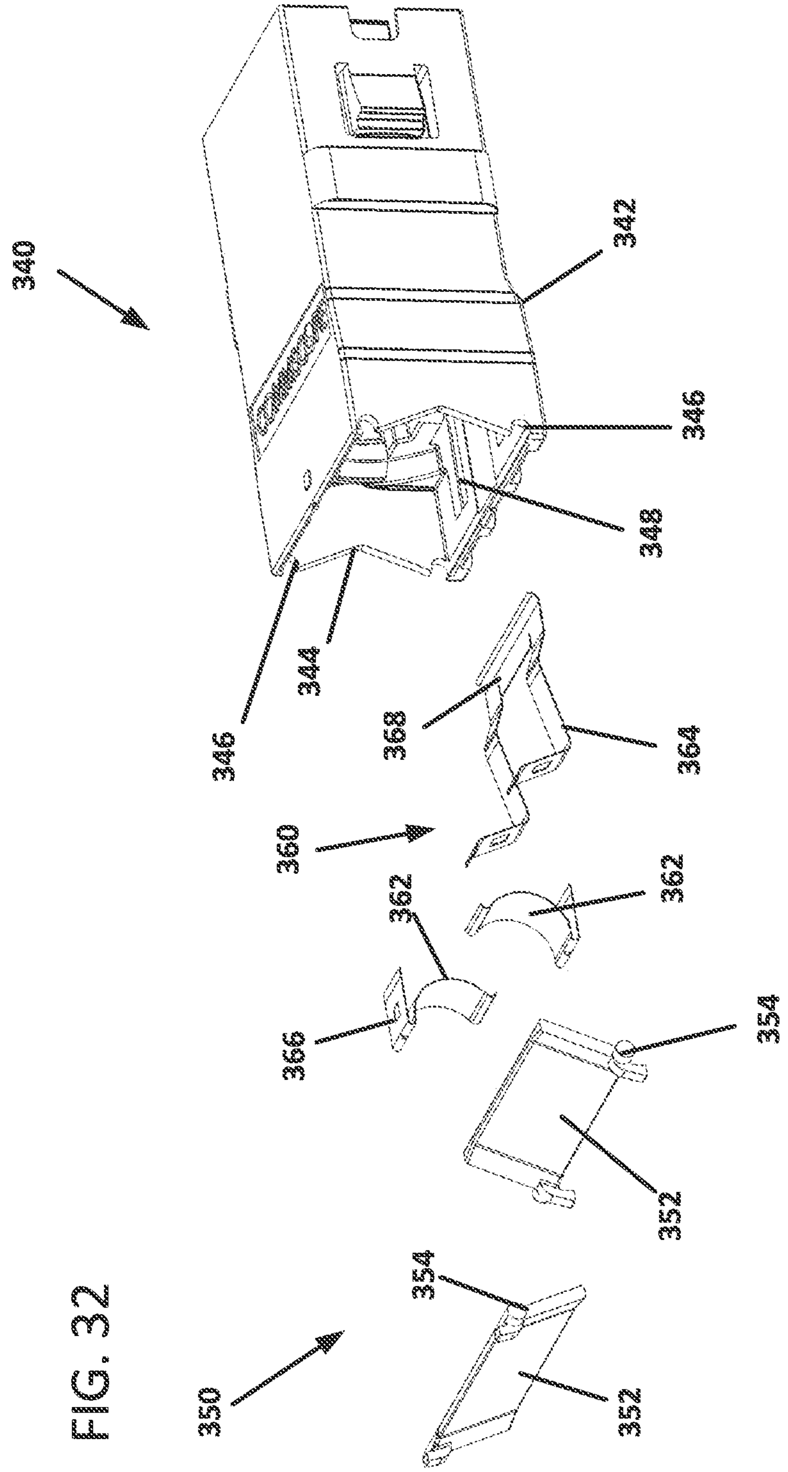
FIG. 32 is a perspective view showing the shutters and springs exploded outwardly from the port member of FIG. 31.
Figure 33:
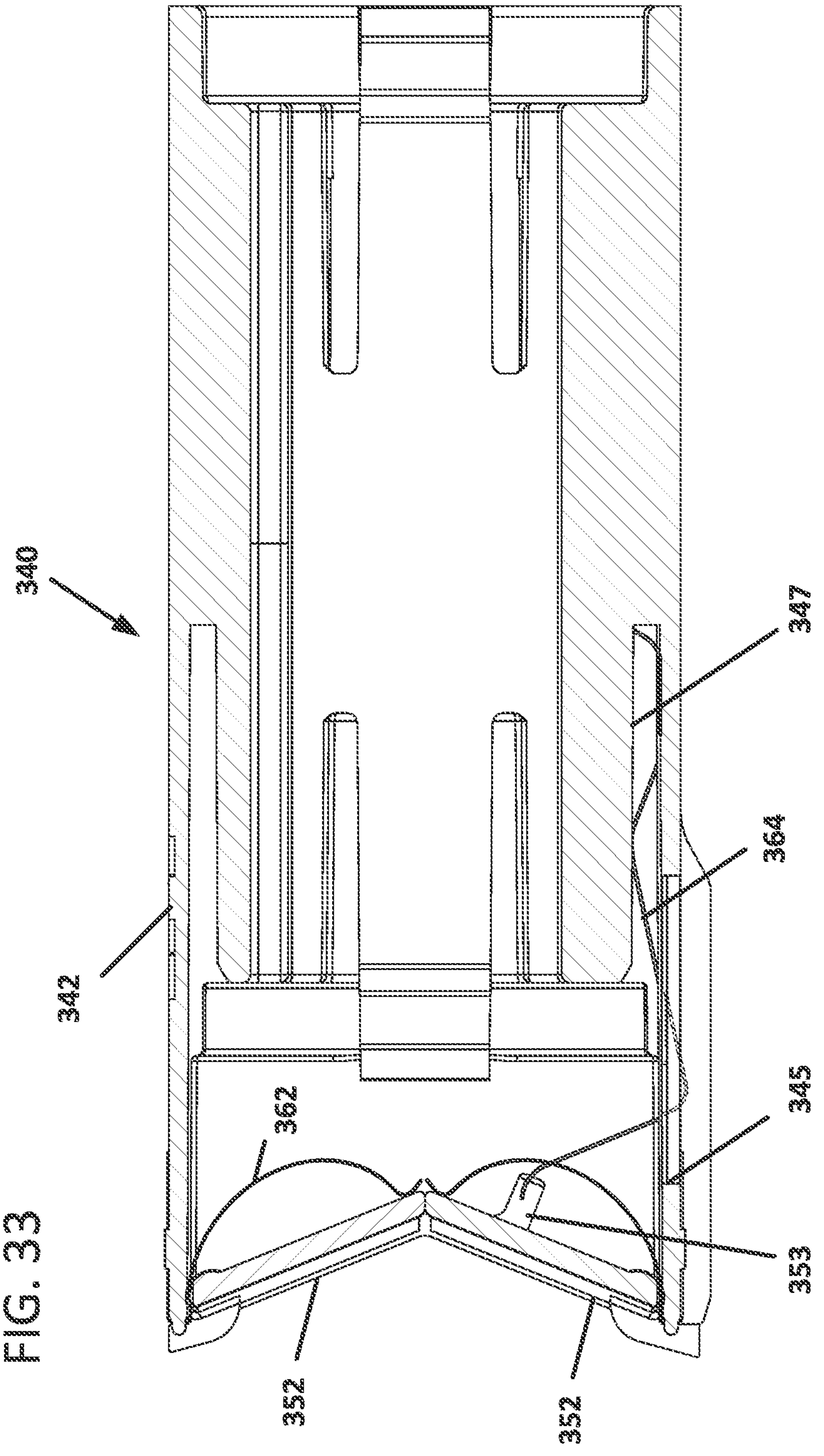
FIG. 33 is an axial cross-section taken of the port member of FIG. 31 along the 33-33 plane of FIG. 31.
Figure 34:
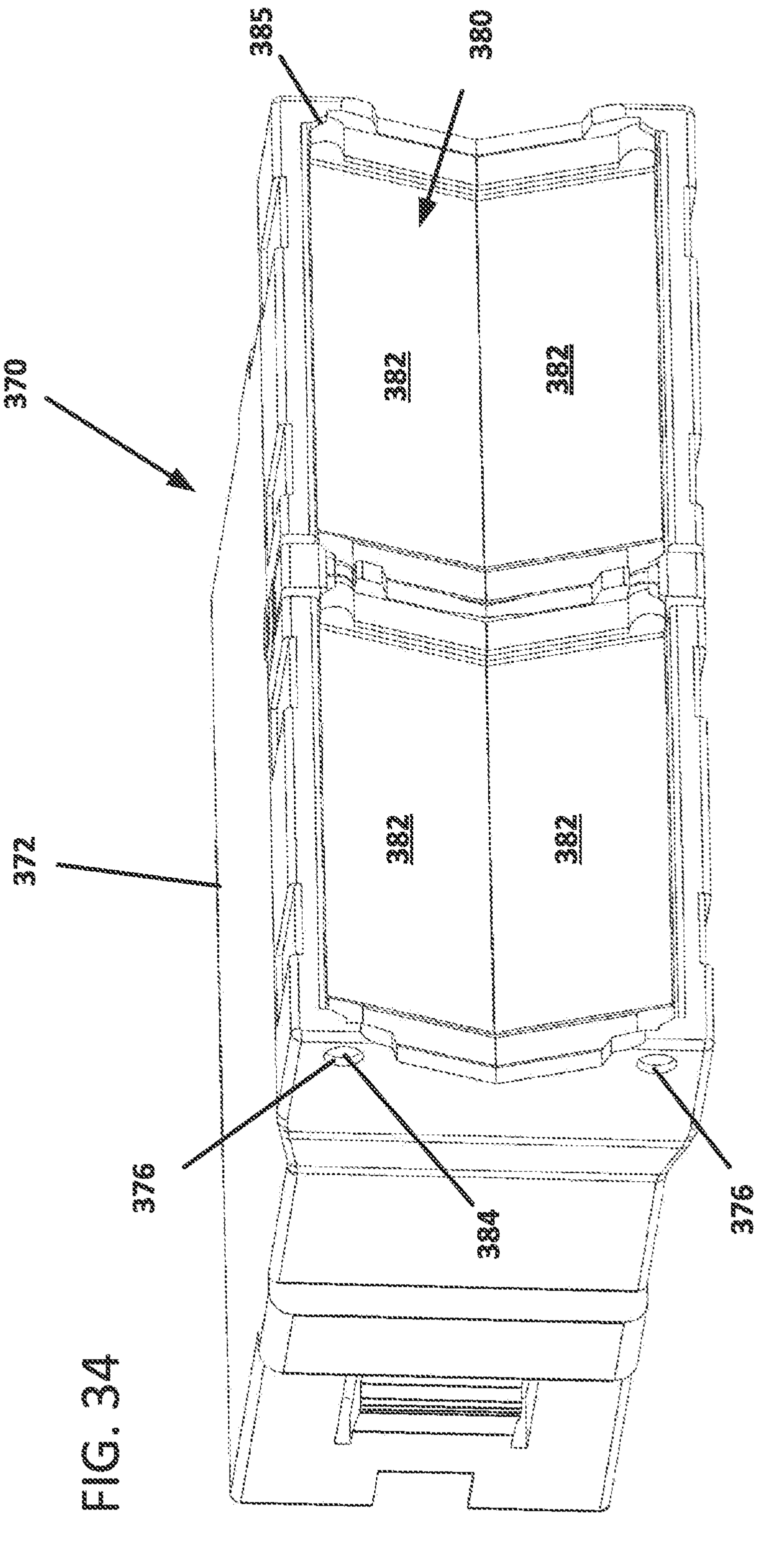
FIG. 34 is a perspective view of an example implementation of a port member configured to receive a multi-fiber plug connectors.
Figure 35:
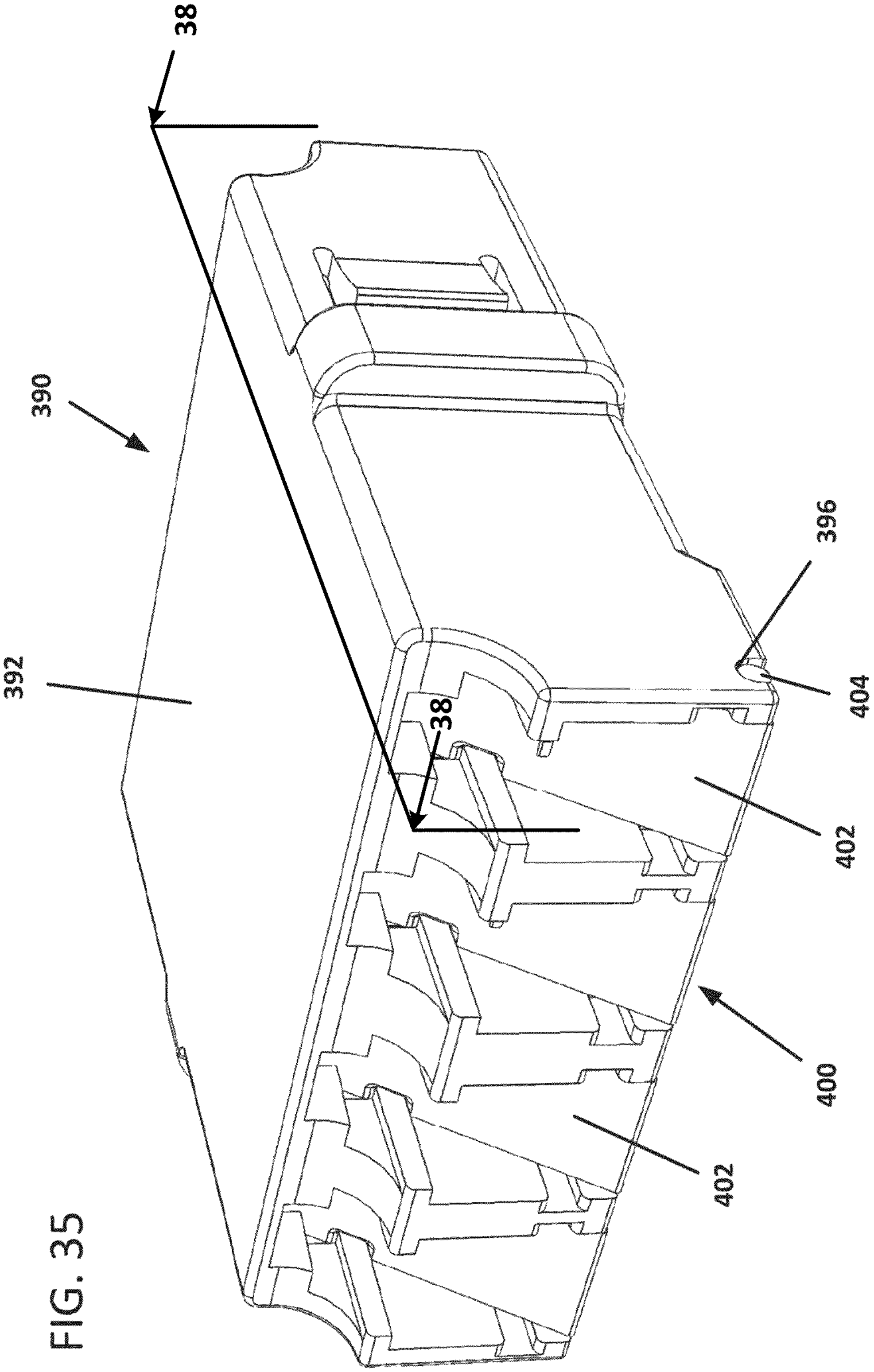
FIG. 35 is a top perspective view of an example implementation of a port member configured to receive single fiber plug connectors or duplex fiber plug connectors.
Figure 36:
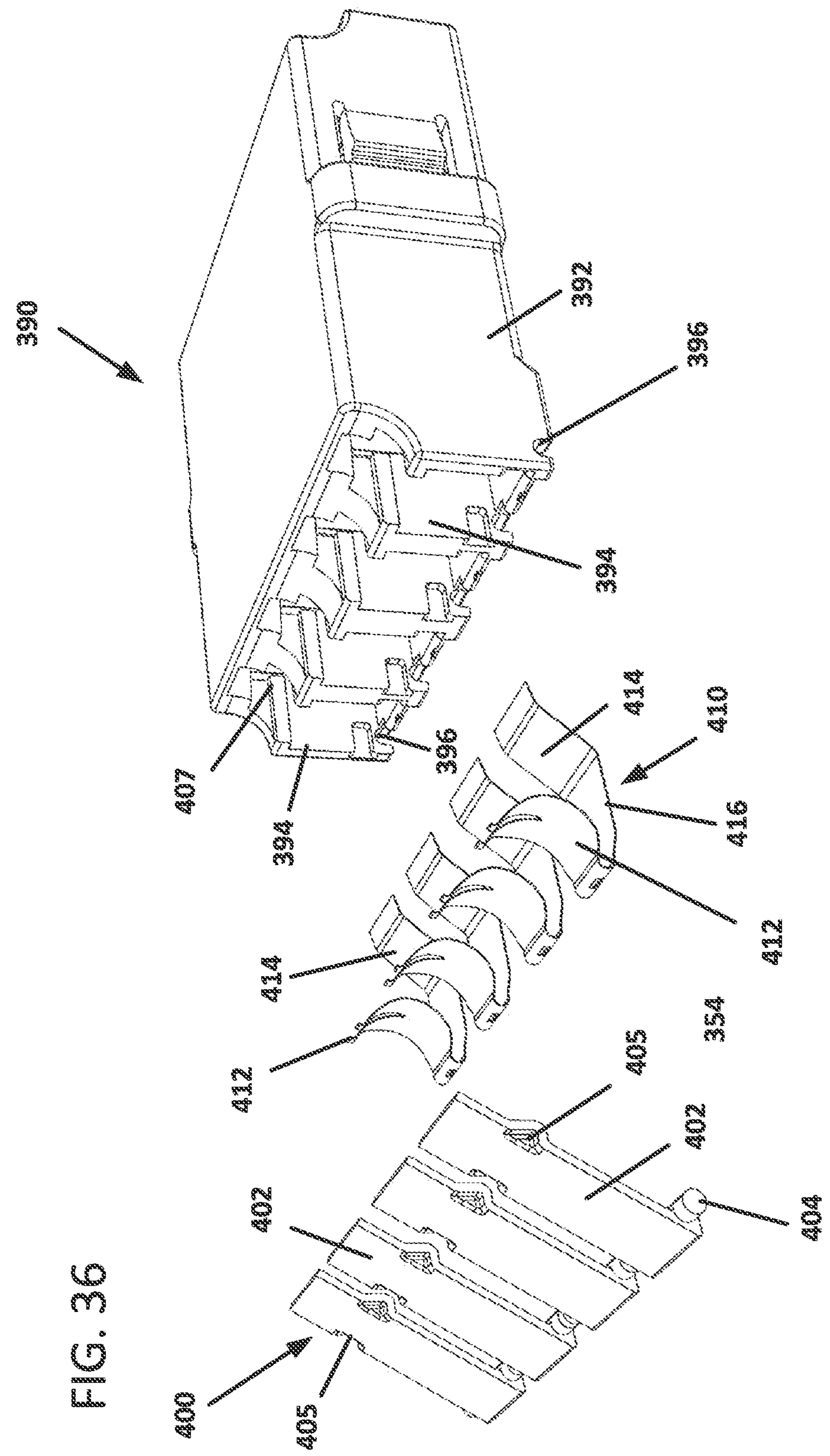
FIG. 36 is a perspective view showing the shutters and springs exploded outwardly from the port member of FIG. 35.
Figure 37:
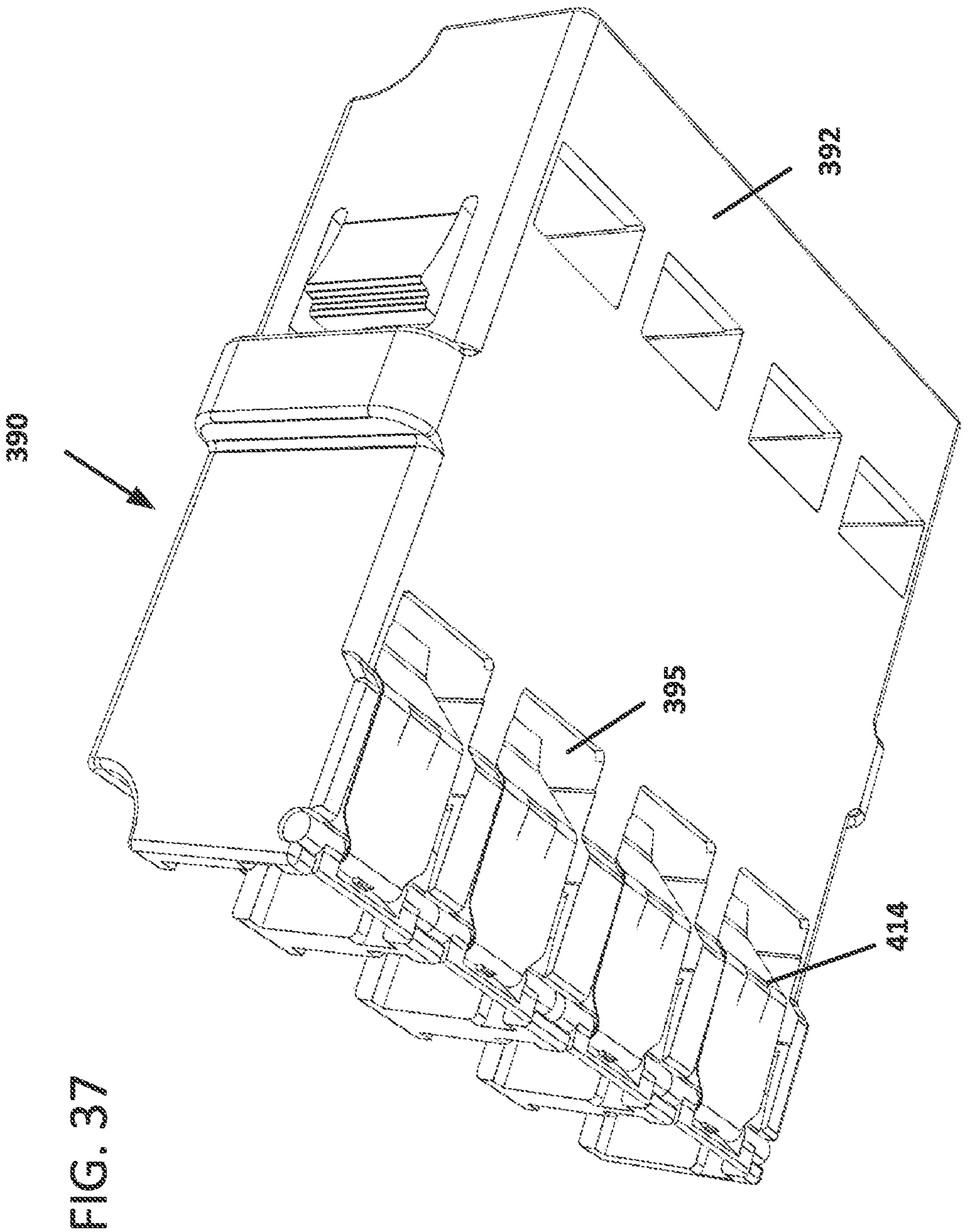
FIG. 37 is a bottom perspective view of the port member of FIG. 35.

FIGS. 26-38 illustrate additional examples of port members (e.g., optical adapters) including shutters configured to assist in presence sensing at the ports. FIGS. 26-30 illustrate an example implementation 300 of a port member configured to receive a multi-fiber plug connector (e.g., an MPO plug connector). FIGS. 31-33 illustrate another example implementation 340 of a port member configured to receive a multi-fiber plug connector (e.g., an MPO plug connector). FIG. 34 illustrates an example implementation 370 of a port member configured to receive multiple multi-fiber plug connectors (e.g., MPO plug connectors). FIGS. 35-38 illustrate an example implementation 390 of a port member configured to receive a plurality of single-fiber or duplex plug connectors (e.g., an LC or duplex LC plug connector).

The port member 300, 340, 370, 390 includes an adapter body 302, 342, 372, 392 defining a front aperture 304, 344, 374, 394 through which the plug connector can be received. A shutter arrangement 310, 350, 380, 400 is disposed at the front aperture 304, 344, 374, 394 to block the front aperture 304, 344, 374, 394 when no plug connector is received at the front aperture 304, 344, 374, 394. The shutter arrangement 310, 350, 380, 400 includes a shutter 312, 352, 382, 402 that pivotally mounts to the adapter body 302, 304, 344, 374, 394. Each shutter 312, 352, 382, 402 is mounted to the adapter body 302, 342, 372, 392 to move (e.g., pivot) between an open position that provides access to the port 115 and a closed position that blocks access to the port 115. In certain examples, the shutter arrangement 310, 350, 380, 400 includes first and second shutters 312, 352, 382 that cooperate to cover the front aperture 304, 344, 374.

In certain implementations, each shutter 312, 352, 382, 402 includes hinge pins 314, 354, 384, 404 that mount within a groove or notch 306, 346, 376, 396 defined by the adapter body 302, 304, 344, 374, 394. In the examples shown in FIGS. 29 and 35, the hinge pins 314, 404 snap into the notches 306, 396 from the bottom of the adapter body 302, 392. In the example shown in FIG. 29, some of the shutters also snap into the grooves 306 from the top of the adapter body 302. In the example shown in FIG. 32, the hinge pins 354 snap into the notches 346 from the front of the adapter body 342. In the example shown in FIG. 34, the hinge pins 384 snap into holes 376 defined at outer walls of the adapter body 372 and into notches defined at inner walls of the adapter body 372.

In certain implementations, the shutters 312, 352, 382, 402 of the shutter arrangement 310, 350, 380, 400 are biased to the closed position by one or more biasing springs 322, 362, 412. In certain implementations, the shutters 312, 352, 382, 402 are attached to a spring arrangement 320, 360, 410 that biases the shutters 312, 352, 382, 402 to the closed position. In certain implementations, the spring arrangement 320, 360, 410 also provides spring contacts 324, 364, 414 by which the presence of a plug connector at the port 115 can be detected. For example, insertion of the plug connector into the port 115 pushes the shutter 312, 352, 382, 402 to the open position and thereby presses the spring contact 324, 364, 414 against a pad on the circuit board 142.

In some implementations, the biasing springs 322, 412 and the spring contacts 324, 414 form integrated spring members 326, 366. For example, in FIG. 27, a first spring member 326 includes a biasing spring 322 for the lower shutter 312 and two spring contacts 324 disposed on opposite sides of the biasing spring 322. A second spring member 328 includes only a biasing spring 322 to close the upper shutter 312. In the example shown in FIG. 36, separate spring members 416 each include a biasing spring 412 and a spring contact 414. In the example shown in FIG. 32, the biasing springs 362 are each formed by a respective spring member 366 while the spring contacts 364 are formed by a common spring member 368.

Figure 28:
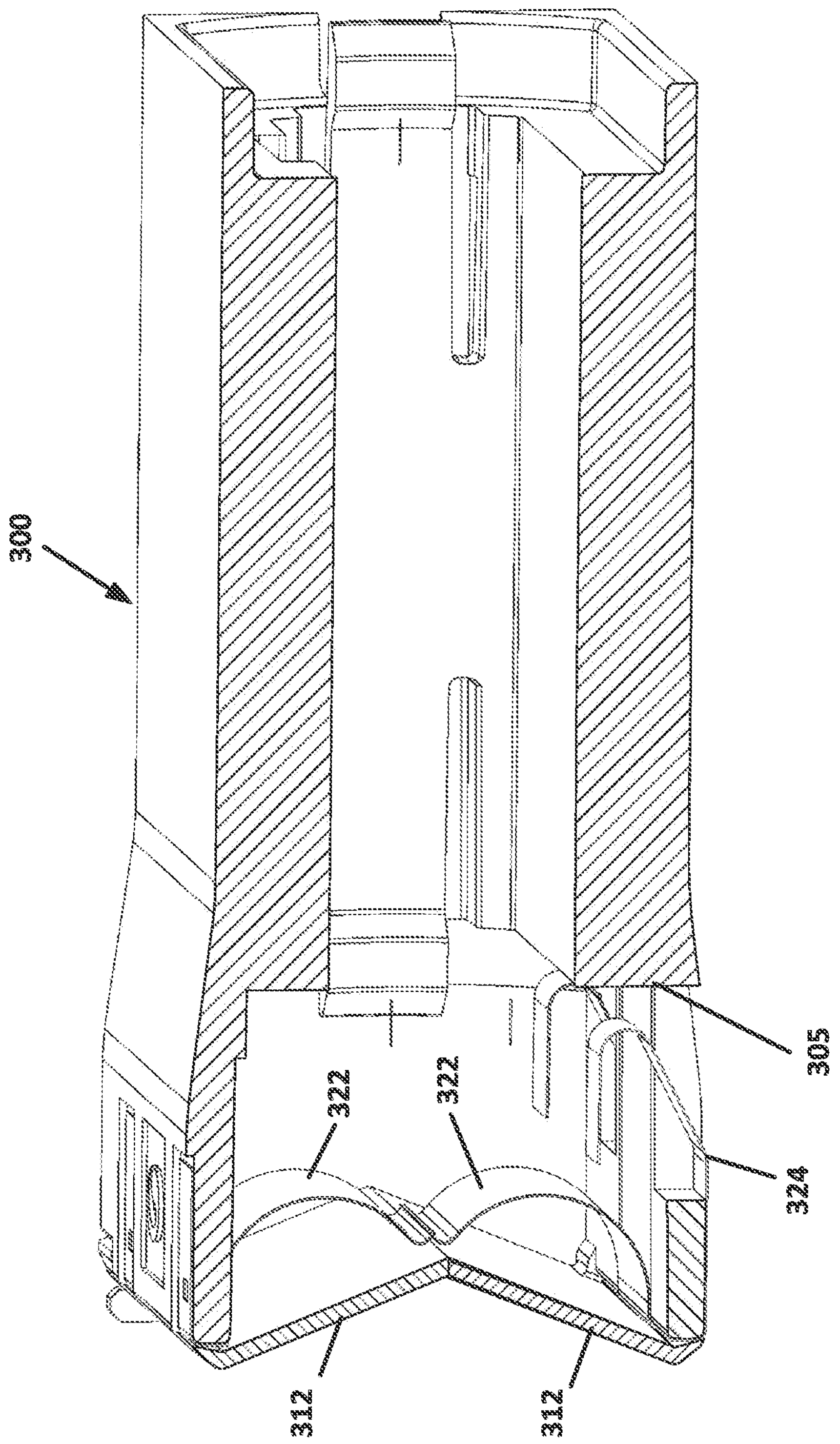
FIG. 28 is an axial cross-section taken of the port member of FIG. 26 along the 30-30 plane of FIG. 26.
Figure 29:
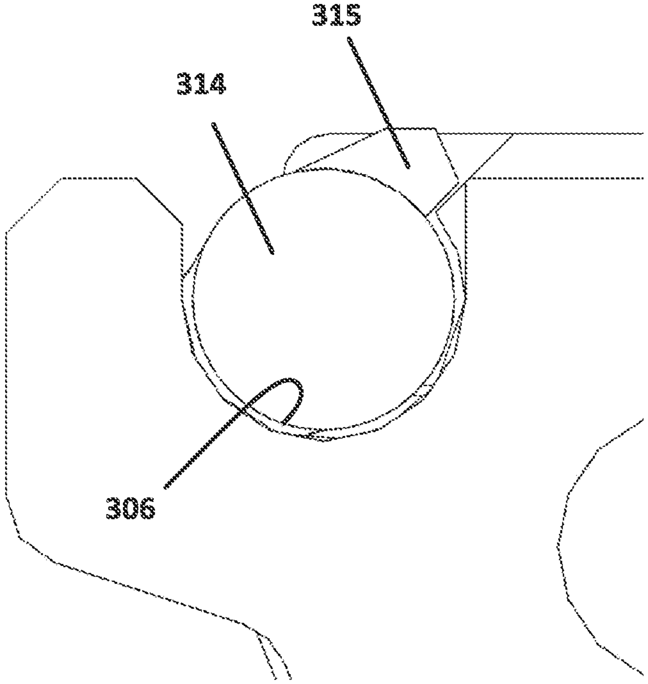
FIG. 29 is cross-sectional image taken of a portion of the port member of FIG. 26 along the 29-29 line.
Figure 30:
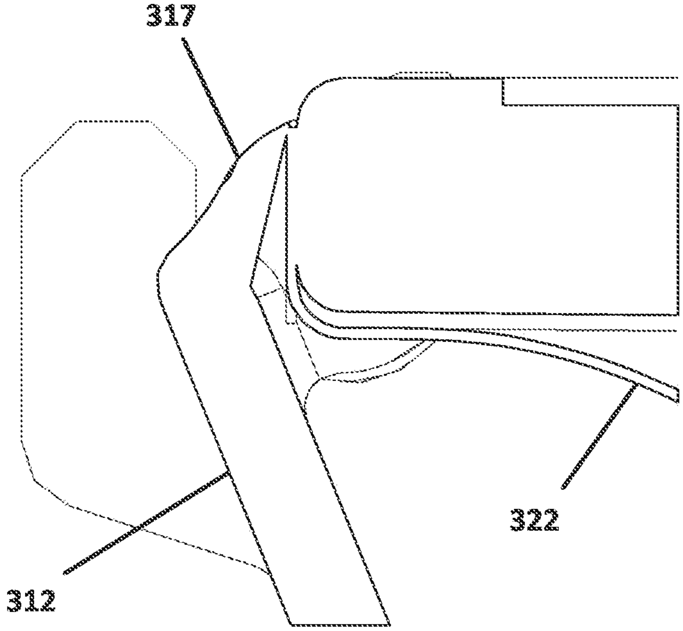
FIG. 30 is cross-sectional image taken of a portion of the port member of FIG. 26 along the 30-30 line.
Figure 38:
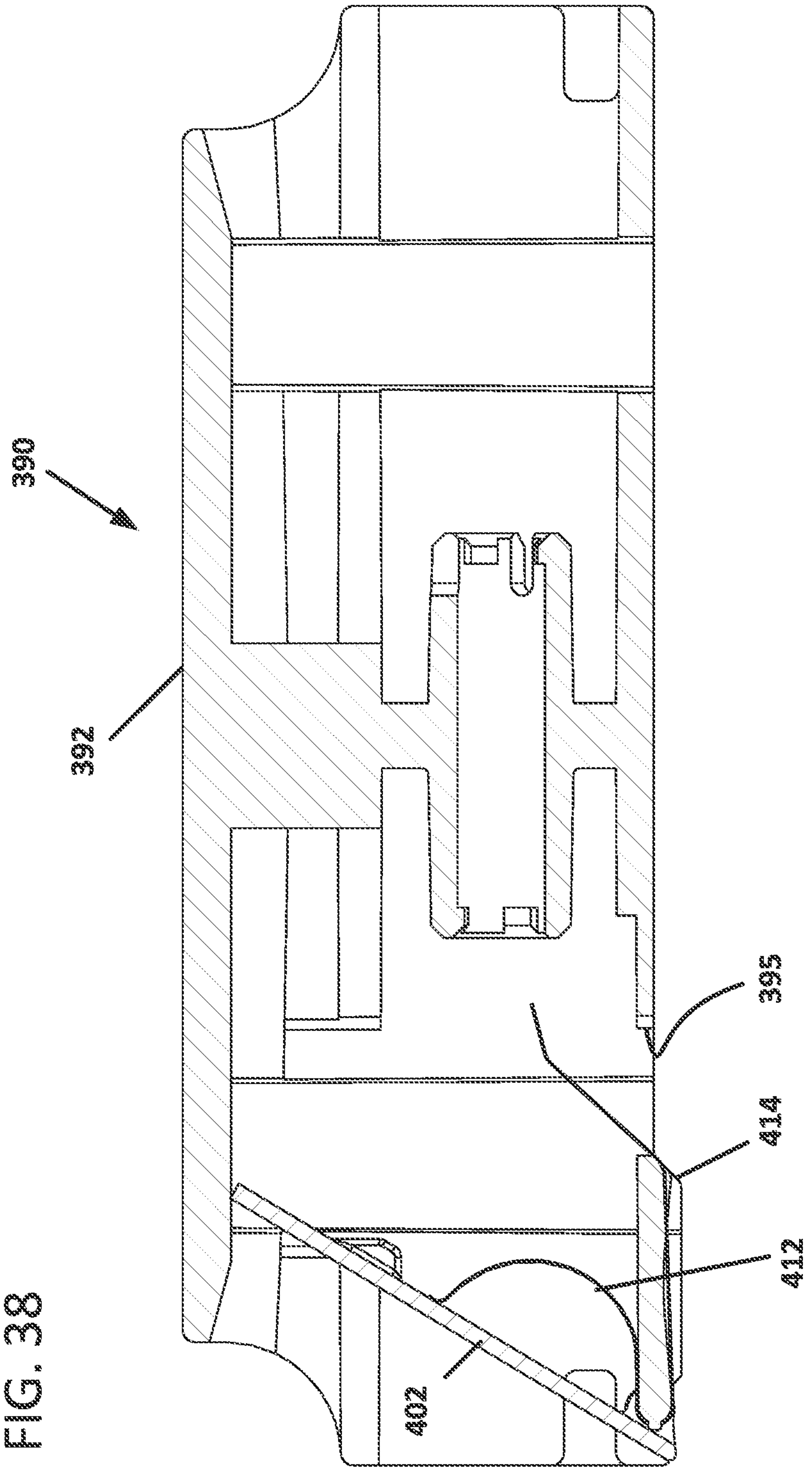
FIG. 38 is an axial cross-section taken of the port member of FIG. 35 along the 38-38 plane of FIG. 35.

As shown in FIGS. 28, 33, and 38, each adapter body 302, 342, 372, 392 defines one or more apertures 305, 345, 395 through which the spring contact 324, 364, 414 protrudes to contact the circuit board 142. The apertures 305, 345, 395 are disposed at a bottom surface of the adapter body 302, 342, 392 towards a front of the adapter body 302, 342, 392.

As shown in FIGS. 28 and 38, the spring contacts 324, 414 enter the adapter body 302, 392 through the apertures 305, 395. When a plug is inserted into the port 115, the plug deflects the bottom shutter 312 downwardly towards the closed position. The bottom shutter 312, 402 engages the distal ends of the spring contacts 324, 414 and deflects an intermediate portion of the spring contacts 324, 414 towards the circuit board 142 by pushing a portion of the spring contacts 324, 414 through the aperture 305, 395.

In the example shown in FIG. 33, the adapter body 342 defines a cavity 347 that extends along a depth of the adapter body 342 and opens towards the front of the adapter body 342. The spring contact 364 extends from a first end attached to the bottom shutter 352 at a mount 353 to a second end disposed within the cavity 347. In certain examples, the second end of the spring contact 364 is movable (e.g., slidable) within the cavity 347. When the bottom shutter 352 is deflected to the closed position, the first end of the spring contact 364 is deflected inwardly and downwardly. However, movement of the second end of the spring contact 364 is limited within the cavity 347. Accordingly, continued deflection of the first end causes an intermediate portion of the spring contact 364 to pass through the aperture 345 to engage the circuit board 142.

In certain implementations, the shutters 312, 352, 382, 402 include limiters 315, 355, 385, 405 that engage structure on the adapter body 302, 342, 372, 392 to inhibit over travel of the shutters 312, 352, 382, 402 past the closed position. In the examples shown in FIG. 29, the hinge pins 314 of the shutters 312 include a limiter 315 that protrudes outwardly from the hinge pin 314. The limiter 315 travels between opposite sides of the notch 306 during movement of the shutter 312 between open and closed positions. In certain examples, the shutter 312 also includes a second limiter 317 extending between the hinge pins 314 (see FIG. 30-FIG. 55). The second limiter 317 is configured to engage the front of the adapter body 302 when the shutter 312 is disposed in the closed position to inhibit movement of the shutter 312 beyond the closed position.

In the example shown in FIG. 31, the limiters 355 are offset from the hinge pins 354 and configured to engage the front of the adapter body 342 when the shutter 352 is disposed in the closed position to inhibit movement of the shutter 352 beyond the closed position. In FIG. 34, the hinge pin 384 defines a notched or recessed region 385 that receives a rail or ledge protruding inwardly from an interior sidewall of the adapter body 372 when the shutter 382 is disposed in the closed position to inhibit movement of the shutter 382 beyond the closed position. In the example shown in FIG. 36, each shutter 402 defines a notch or recess 405 that is configured to engage a rail or other inward protrusion 407 from the interior walls of the adapter body 392 when the shutter 402 is disposed in the closed position to inhibit movement of the shutter 402 beyond the closed position.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A port arrangement configured to align a first optical fiber terminated by a first plug connector with a second optical fiber, the port arrangement comprising:
- a port member defining a forward port and a rearward port, the rearward port being aligned with the forward port;
- a shutter disposed at the forward port of the port member, the shutter being movable between open and closed positions;
- a biasing member biasing the shutter to the closed position; and
- a circuit board including a presence detection circuit, wherein the biasing member completes the presence detection circuit when disposed in one of the open and closed positions and wherein the biasing member breaks the presence detection circuit when disposed in the other of the open and closed positions.

2. The port arrangement of claim 1, wherein the biasing member includes a first resilient portion and a second resilient portion, the first resilient portion being configured to bias the shutter to the closed position, and the second resilient portion configured to press a contact surface of the biasing member against the presence detection circuit.

3. The port arrangement of claim 2, wherein the contact surface bridges two landing pads on the circuit board when the biasing member completes the presence detection circuit.

4. The port arrangement of claim 2, wherein the contact surface is carried by the shutter to move with the shutter as a unit.

5. The port arrangement of claim 2, wherein the port member defines a window facing the circuit board, wherein the contact surface extends along the window.

6. The port arrangement of claim 5, wherein the shutter includes a pressing member configured to press the contact surface into completing the presence detection circuit.

7. The port arrangement of claim 5, wherein the second resilient portion extends into the port member through the window.

8. The port arrangement of claim 1, wherein a free end of the biasing member is configured to slide along a pocket or groove defined by the shutter.

9. The port arrangement of claim 1, wherein the biasing member includes a first resilient portion and a contact surface, the first resilient portion being configured to bias the shutter to the closed position, and the contact surface being aligned with a window defined in the port member.

10. The port arrangement of claim 9, wherein a secondary spring contact is mounted to the circuit board in alignment with the window, and wherein the contact surface contacts the secondary spring contact when the shutter is disposed in the open position.

11. The port arrangement of claim 1, wherein the forward port is one of a plurality of forward ports, wherein the shutter is one of a plurality of shutters each disposed at one of the forward ports; and wherein the biasing member is one of a plurality of biasing members mechanically coupled together, each of the biasing members being configured to bias a respective one of the shutters closed.

12. The port arrangement of claim 11, wherein each of the biasing members includes a first resilient portion and a second resilient portion, the first resilient portion being configured to bias the respective shutter to the closed position.

13. The port arrangement of claim 12, wherein the second resilient portion of each biasing member is configured to bias a respective contact surface against a respective presence detection circuit associated with the respective forward port.

14. The port arrangement of claim 12, wherein the second resilient portion has a forked end.

15. The port arrangement of claim 12, wherein the first resilient portion has a forked end.

16. A method for detecting a presence of a plug connector at a port, the method comprising:
- inserting a plug connector into the port of a body;
- deflecting a shutter at the port from a closed position covering the port towards an open position by pushing the shutter with the plug connector, wherein deflecting the shutter towards the open position includes moving a free end of the shutter towards a circuit board coupled to the body; and
- electrically connecting a spring contact to a landing pad on the circuit board through deflection of the spring contact by the shutter, thereby opening or closing a circuit that includes the landing pad.

17. The method of claim 16, further comprising applying a voltage to the landing pad and connecting the spring contact to ground.

18. The method of claim 16, further comprising applying a voltage to the landing pad and connecting a second landing pad to ground, wherein continuing to deflect the shutter causes a first portion of the spring contact to engage the landing pad and causes a second portion of the spring contact to engage the second landing pad.

19. The method of claim 16, further comprising detecting a change in a status of the circuit at a processor electrically coupled to the landing pad.

20. The method of claim 16, wherein deflecting the shutter comprises deflecting the shutter against a bias of the spring contact.

* * * * *